(12) United States Patent
Tsuchida et al.

(10) Patent No.: US 10,192,252 B2
(45) Date of Patent: Jan. 29, 2019

(54) INFORMATION PROCESSING APPARATUS TO PROVIDE POSITION BASED SERVICES

(71) Applicant: SONY CORPORATION, Tokyo (JP)

(72) Inventors: Yoshihisa Tsuchida, Kanagawa (JP);
Nobutatsu Takahashi, Tokyo (JP);
Seiya Amatatsu, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 719 days.

(21) Appl. No.: 14/067,044

(22) Filed: Oct. 30, 2013

(65) Prior Publication Data
US 2014/0156462 A1    Jun. 5, 2014

(30) Foreign Application Priority Data
Dec. 3, 2012    (JP) ................................ 2012-264367

(51) Int. Cl.
G06Q 30/06    (2012.01)
H04W 64/00    (2009.01)
G06F 3/00     (2006.01)

(52) U.S. Cl.
CPC ...... *G06Q 30/0623* (2013.01); *H04W 64/003* (2013.01)

(58) Field of Classification Search
USPC ..................................................... 705/26.61
See application file for complete search history.

(56) References Cited

U.S. PATENT DOCUMENTS 7,149,696 B2 *  12/2006  Shimizu ............ G06Q 30/0273
                                                 705/14.69
7,958,451 B2 *   6/2011  Ishida  ............... G06F 17/30873
                                                 707/708

* cited by examiner

Primary Examiner — Garcia Ade
(74) Attorney, Agent, or Firm — Chip Law Group

(57) ABSTRACT

There is provided an information processing apparatus including a database configured to store position data indicating a current position of at least one search target person, the position data being received from a communication apparatus of the at least one search target person, an information providing unit configured to provide the position data of the at least one search target person to a terminal apparatus of a searcher in response to an information request from the terminal apparatus of the searcher, and a communication mediation unit configured to receive, from the terminal apparatus, a communication request for requesting communication with a search target person who is selected by the searcher based on the provided position data, and to transmit a communication message to a communication apparatus of the selected search target person.

19 Claims, 17 Drawing Sheets

| PHOTOGRAPHER ID | NICKNAME | SEX | MAIL ADDRESS | PROFILE IMAGE | SPECIALITY | | ... | USED MODEL | |
| --- | --- | --- | --- | --- | --- | --- | --- | --- | --- |
| | | | | | A1 | A2 | ... | CAMERA | LENS |
| P01 | Allen | M | ... | PI01.jpg | ○ | — | ... | So-A900 | 70-200F2.8G |
| P02 | Rachel | F | ... | PI02.jpg | — | ○ | ... | Ca-1DX | EF135F2L |
| .. | .. | .. | .. | .. | .. | .. | ... | .. | .. |

| PHOTOGRAPHER ID | NUMBER OF UPLOADED PHOTOGRAPHS | RATING | RANK | SPECIAL NOTE | STATUS | CURRENT POSITION | MOVING RANGE |
| --- | --- | --- | --- | --- | --- | --- | --- |
| P01 | 32,521 | 5 | 12 | ... | Available | ... | ... |
| P02 | 19,732 | 4 | 55 | ... | Available | ... | ... |
| .. | .. | .. | .. | .. | .. | .. | .. |

SEARCH TARGET PERSON DATA

| USER ID | NICKNAME | SEX | MAIL ADDRESS | DEFAULT SEARCH CONDITION | | SERVICE USE COUNT | NUMBER OF PURCHASED PHOTOGRAPHS |
|---|---|---|---|---|---|---|---|
| | | | | SEX | ... | | |
| U01 | Jack | M | ... | any | ... | 10 | 55 |
| U02 | Jane | F | ... | F | ... | 5 | 12 |
| .. | .. | .. | .. | .. | .. | .. | .. |

SEARCHER DATA

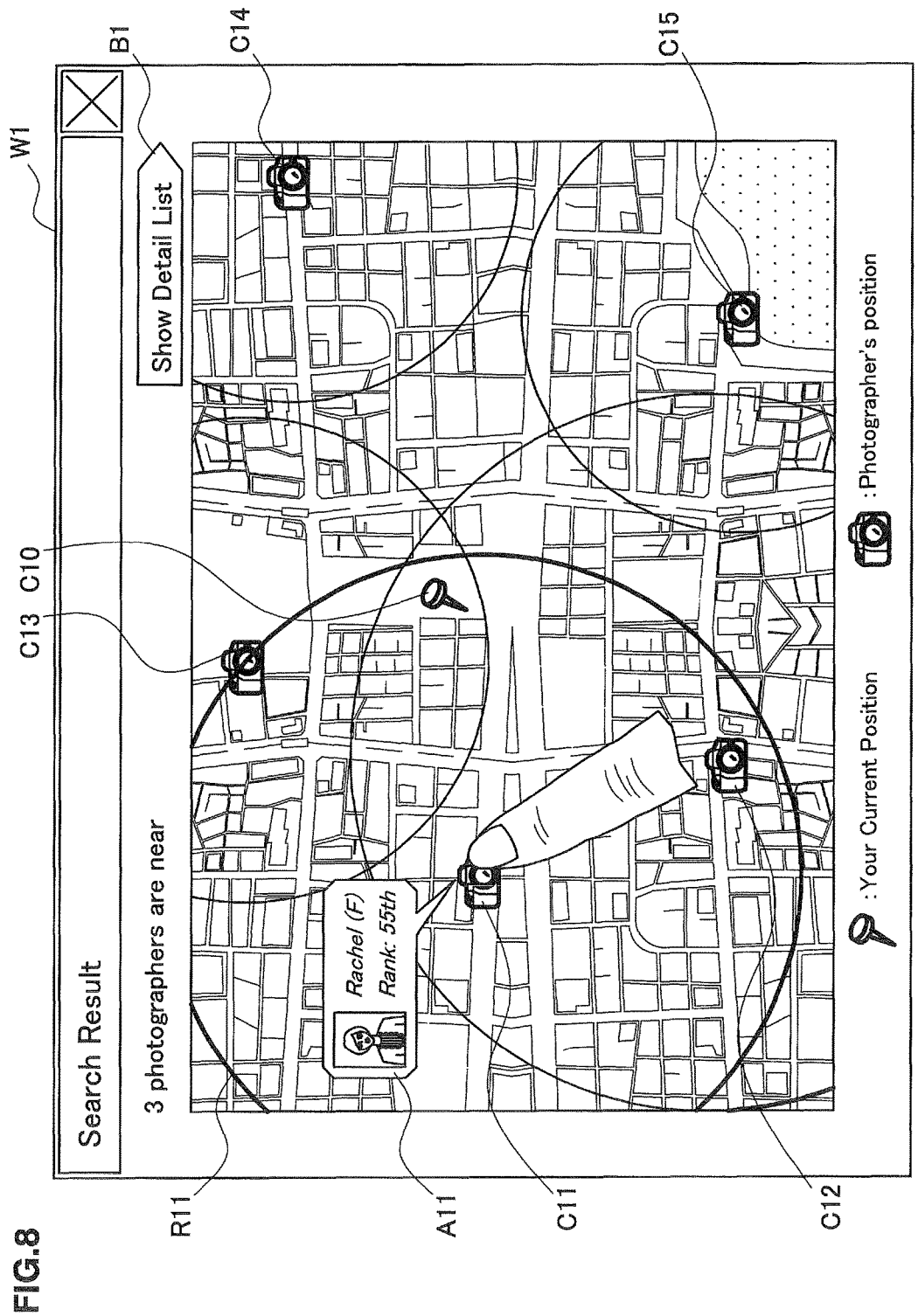

FIG. 9

| Image | Name/Profile | Rank/Special Note | Camera/Lens Info. |
|---|---|---|---|
| ★★★★ | Allen<br>Sex: Male<br>Age: 35<br>Speciality:<br>- Portrait<br>- Pet | Rank: 12 (2013)<br>Upload: 32,521pics<br>Note:<br>- Ranked 4-th, 2011.<br>- Attended special session in summer. | So-A900  70-200F2.8G  [Zoom] |
| ★★★★ | Rachel<br>Sex: Female<br>Age: 32<br>Speciality:<br>- Scenary<br>- Sports | Rank: 55 (2013)<br>Upload: 19,732 pics<br>Note:<br>- Ranked 9-th, 2009. | Ca-1DX  EF135F2L  [Bokeh] [Bright] |
| ★★★★ | Matthew<br>Sex: Male<br>Age: 29<br>Speciality:<br>- Portrait | Rank: 105 (2013)<br>Upload: 134 pics<br>Note:<br>- Won Geographic Photo Gold Prize 2011. | Ni-D4  10-24f/3.5-4.5G  [Group Photo] |

Search Result

Tap to select photographer

| SERVICE ID | USER ID | PHOTOGRAPHER ID | DATE AND TIME | PLACE | SERVICE STATUS | NUMBER OF UPLOADED PHOTOGRAPHS | RATING |
|---|---|---|---|---|---|---|---|
| SV01 | U01 | P02 | ... | ... | Purchased | 12 | Very Good |
| SV02 | U01 | P11 | ... | ... | Boforo Service | 0 | — |
| .. | .. | .. | .. | .. | .. | .. | .. |

SEARVICE PROVIDING DATA

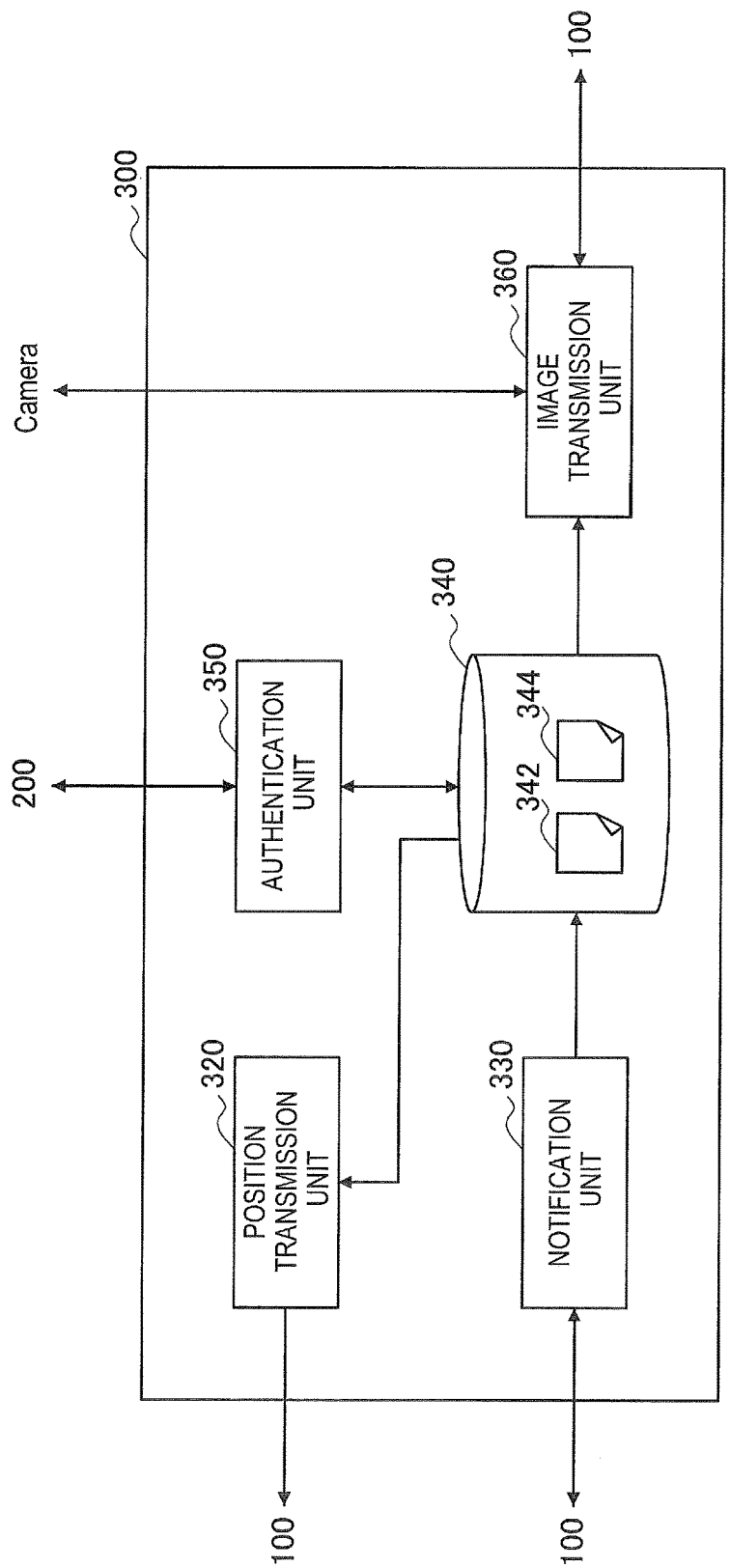

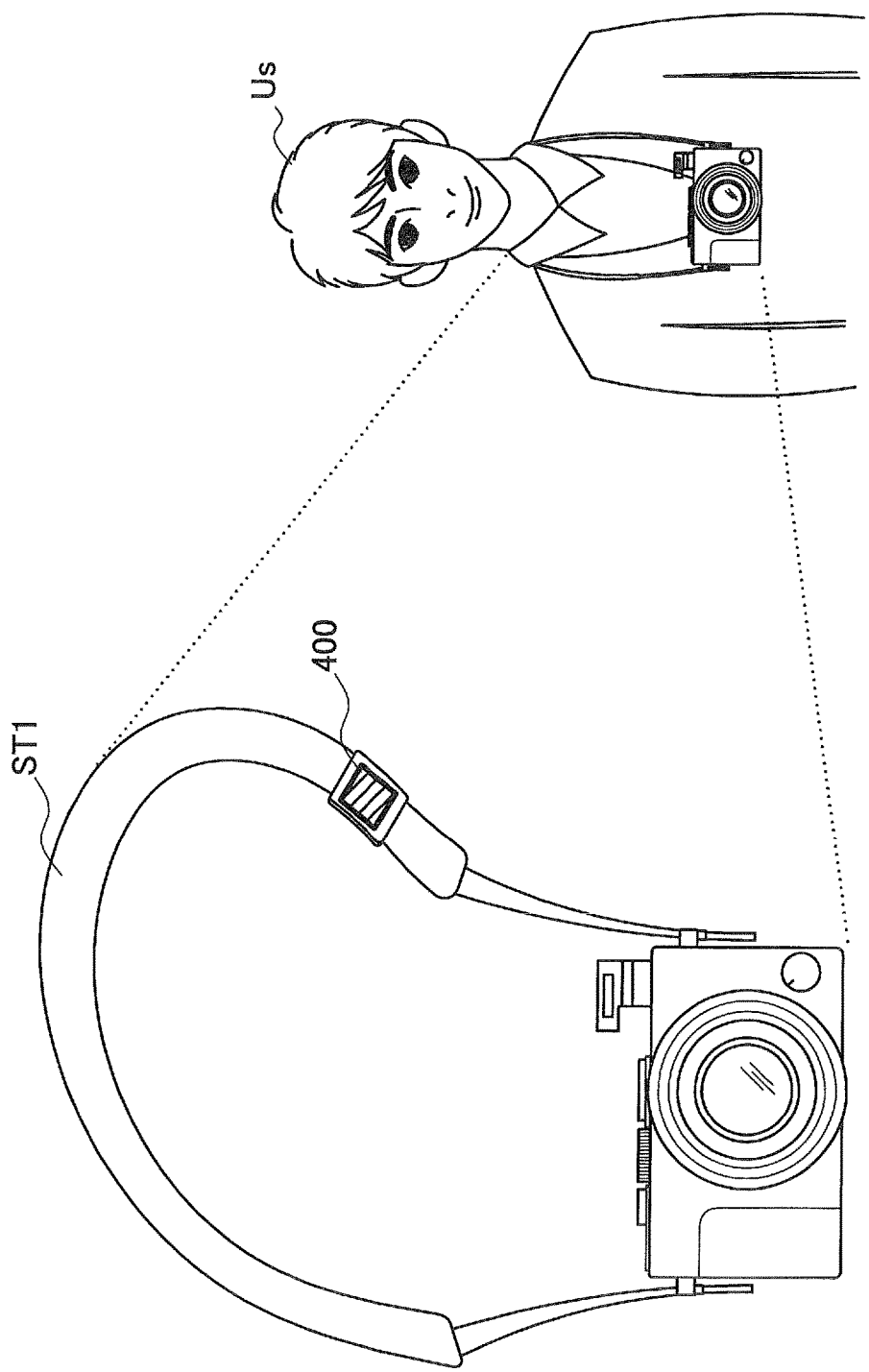

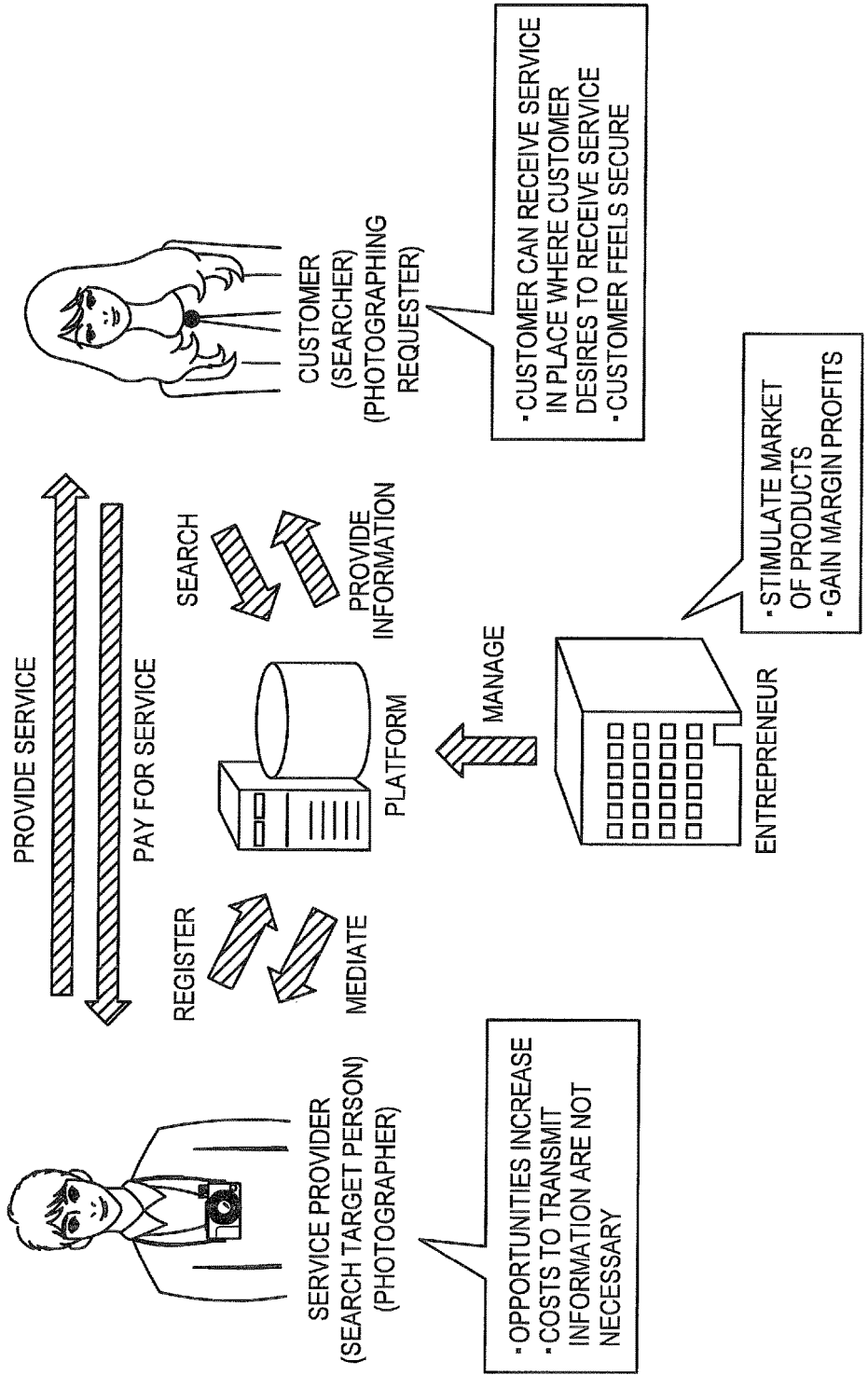

INFORMATION PROCESSING APPARATUS TO PROVIDE POSITION BASED SERVICES

CROSS REFERENCE TO RELATED APPLICATION(S)

This application claims the benefit of Japanese Priority Patent Application JP 2012-264367 filed Dec. 3, 2012, the entire contents of which are incorporated herein by reference.

BACKGROUND

The present disclosure relates to an information processing apparatus, an information processing method, a program, a terminal apparatus, and a communication apparatus.

In various services in the real world, service providers transmit information regarding their own services on the Internet in order to catch customers' attention. Typical information that is transmitted includes the address of a service provider and contents of the service (see "SONY Store No Goannai," [online], [retrieved on Nov. 7, 2012], the Internet <URL: http://store.sony.jp/Store/>).

However, when services are not provided on a large scale enough to transmit information regarding the services on the Internet (for example, when an individual provides a service as his/her hobby or a sideline on weekends), the service providers generally dislike bearing the great costs to transmit the information.

SUMMARY

For example, if a service is provided at a fixed place, it would be relatively easy to publish information regarding that place on a Web page and wait for a customer. However, in the case where it is difficult to predict in advance where a service is provided, or in the case where a service provider and a customer may move, it is also difficult to designate a place in advance where the service is provided. As a result, individuals have not yet provided or received services actively enough since there has not yet been provided a mechanism for efficiently introducing a service provider to a customer in the above-mentioned cases.

The technology according to an embodiment of the present disclosure realizes a new platform that efficiently introduces a service provider to a customer, and allows individuals to actively provide and receive services.

According to an embodiment of the present disclosure, there is provided an information processing apparatus including a database configured to store position data indicating a current position of at least one search target person, the position data being received from a communication apparatus of the at least one search target person, an information providing unit configured to provide the position data of the at least one search target person to a terminal apparatus of a searcher in response to an information request from the terminal apparatus of the searcher, and a communication mediation unit configured to receive, from the terminal apparatus, a communication request for requesting communication with a search target person who is selected by the searcher based on the provided position data, and to transmit a communication message to a communication apparatus of the selected search target person.

According to another embodiment of the present disclosure, there is provided an information processing method executed by an information processing apparatus, the information processing method including receiving position data from a communication apparatus of at least one search target person, the position data indicating a current position of the at least one search target person, causing a database to store the received position data, providing a terminal apparatus of a searcher with the position data of the at least one search target person in response to an information request from the terminal apparatus of the searcher, the position data being stored by the database, receiving, from the terminal apparatus, a communication request for requesting communication with a search target person who is selected by the searcher based on the provided position data, and transmitting a communication message to a communication apparatus of the selected search target person.

According to still another embodiment of the present disclosure, there is provided a program for causing a computer that controls an information processing apparatus accessible to a database storing position data which is received from a communication apparatus of at least one search target person and indicates a current position of the at least one search target person to function as an information providing unit configured to provide a terminal apparatus of a searcher with the position data of the at least one search target person in response to an information request from the terminal apparatus of the searcher, and a communication mediation unit configured to receive, from the terminal apparatus, a communication request for requesting communication with a search target person who is selected by the searcher based on the provided position data, and to transmit a communication message to a communication apparatus of the selected search target person.

According to still another embodiment of the present disclosure, there is provided a terminal apparatus including a data acquisition unit configured to acquire position data from a server that includes a database regarding at least one search target person and collects the position data indicating a current position of each search target person, and a user interface unit configured to cause a screen to display the position data acquired by the data acquisition unit, and to allow a searcher to select a search target person based on the position data. The user interface unit transmits, to the server, a communication request for requesting communication with the search target person who is selected by the searcher.

According to still another embodiment of the present disclosure, there is provided a communication apparatus including a position transmission unit configured to measure a current position of a photographer, and to transmit position data to a server, the position data indicating the current position, a notification unit configured to, when a communication message is received, notify the photographer that the communication message has been received, the communication message indicating that a user who desires to take a photograph has selected the photographer based on the position data provided by the server, and an image transmission unit configured to acquire, from a camera of the photographer, an image shot for the user, and to transit the acquired image and identification information of the user to an apparatus that provides the user with the image.

The technology according to one or more of embodiments of the present disclosure allows individuals to actively provide and receive services through a new platform which efficiently introduces a service provider to a customer.

BRIEF DESCRIPTION OF THE DRAWINGS

FIG. 6 is an explanatory diagram illustrating a configuration example of search target person data;

FIG. 7 is an explanatory diagram illustrating a configuration example of searcher data;

FIG. 8 is an explanatory diagram illustrating an example of a map that may be displayed as a search result;

FIG. 9 is an explanatory diagram illustrating an example of a list that may be displayed as a search result;

FIG. 10 is an explanatory diagram illustrating a configuration example of service providing data;

FIG. 15 is a block diagram illustrating a configuration example of a logical function of a search target person terminal according to an embodiment;

FIG. 16 is an explanatory diagram for describing a modified example of a search target person terminal; and FIG. 17 is an explanatory diagram for describing a compound effect attained in an embodiment.

DETAILED DESCRIPTION OF THE EMBODIMENT(S)

Figure 1:
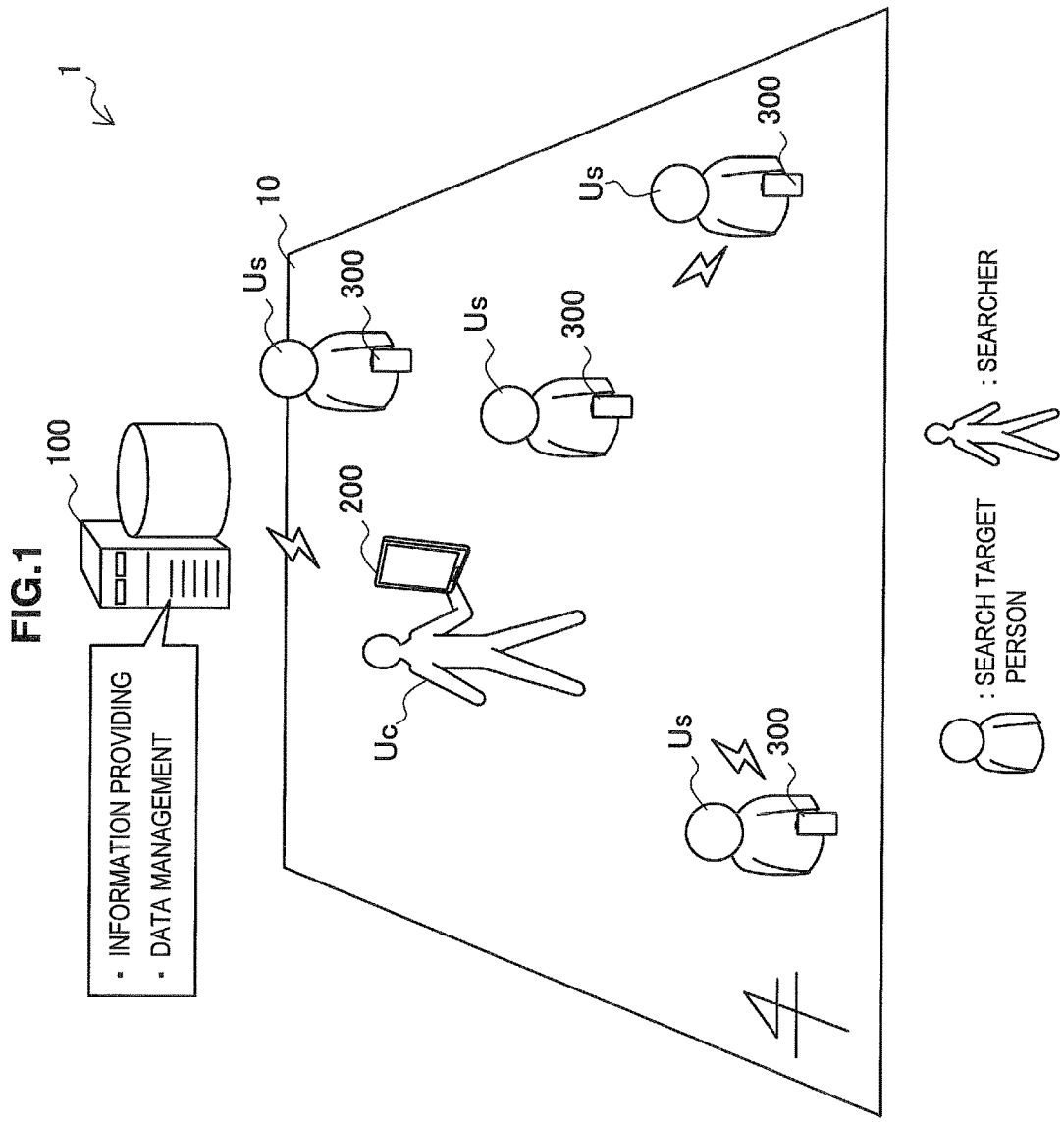
FIG. 1 is an explanatory diagram for describing an overview of the technology according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order:
1. Overview
   1-1. System Configuration Example
   1-2. Use Example
2. Configuration Example of Server Apparatus
   2-1. Hardware Configuration Example
   2-2. Configuration Example of Logical Function
3. Configuration Example of Searcher Terminal
   3-1. Hardware Configuration Example
   3-2. Configuration Example of Logical Function
4. Configuration Example of Search Target Person Terminal
   4-1. Hardware Configuration Example
   4-2. Configuration Example of Logical Function
   4-3. Modified Example
5. Conclusion 1. Overview

[1-1. System Configuration Example]

FIG. 1 is an explanatory diagram for describing an overview of the technology according to an embodiment of the present disclosure. With reference to FIG. 1, an information processing system 1 according to an embodiment is illustrated. The information processing system 1 includes a server apparatus 100, at least one searcher terminal 200, and at least one search target person terminal 300.

The server apparatus 100 is an information processing apparatus for providing a platform that introduces a service provider to a customer. The server apparatus 100 communicates with the searcher terminal 200 and the search target person terminal 300 via the Internet (or another network such as a virtual private network (VPN)). The server apparatus 100 includes a database configured to hold data regarding a service provider, and provides the data in the database in response to an information request. The information processing system 1 presupposes that a user who is a customer of a service searches for a service provider. Thus, a user who is a customer is also referred to as a searcher, and a service provider is also referred to as a search target person in the following description.

The searcher terminal 200 is a terminal apparatus held by a searcher Uc. When the searcher Uc, who moves in a real world 10, desires to use a service, the searcher Uc searches for a service provider by using the searcher terminal 200. The search target person terminal 300 is a terminal apparatus held by a search target person Us. The search target person terminal 300 performs positioning, and transmits position data indicating a current position of the search target person Us to the server apparatus 100.

The searcher terminal 200 and the search target person terminal 300 may be given types of terminal apparatuses such as a smartphone, a tablet personal computer (PC), a notebook PC, a personal digital assistant (PDA), and a game terminal. The searcher terminal 200 and the search target person terminal 300 may also be dedicated apparatuses that are specially designed for a platform which is realized in the information processing system 1.

The searcher terminal 200 causes a screen to display data including current positions of search target people, which is provided from the server apparatus 100 in response to an information request, and allows the searcher Uc to select at least one search target person Us. The server apparatus 100 mediates communication between the searcher Uc and the selected search target person Us. After the server apparatus 100 mediates the communication, the selected search target person Us typically provides a service to the searcher Uc in the real world 10. The server apparatus 100 may take on a part of the tasks of completing the service. For example, the tasks may include exchanging data that is acquired as the resultant outcome of the service in a secure environment, and paying for the service.

Additionally, it will be herein described chiefly as an example that the information processing system 1 includes only one server apparatus 100. However, a function of the server apparatus 100 may be realized substantially through cooperation of multiple apparatuses with each other.

[1-2. Use Example]

An example of services conceivable in the information processing system 1 is taking a photograph. For example, a tourist, a visitor of an amusement park, or a citizen who takes a walk or goes cycling frequently desires to take a photograph at unplanned timing. In addition, in a special scene, they may desire photographs taken with a high-grade model that they do not own (or do not carry with them at that time). Meanwhile, many of those who like taking photographs as their hobbies own a high-grade model of cameras and lenses, but it is difficult for them to encounter so many chances that the high functionality is sufficiently used. They are therefore looking for such chances. Thus, if the information processing system 1 introduces those people to each other, it would be possible to concurrently satisfy both needs described above.

Figure 2:
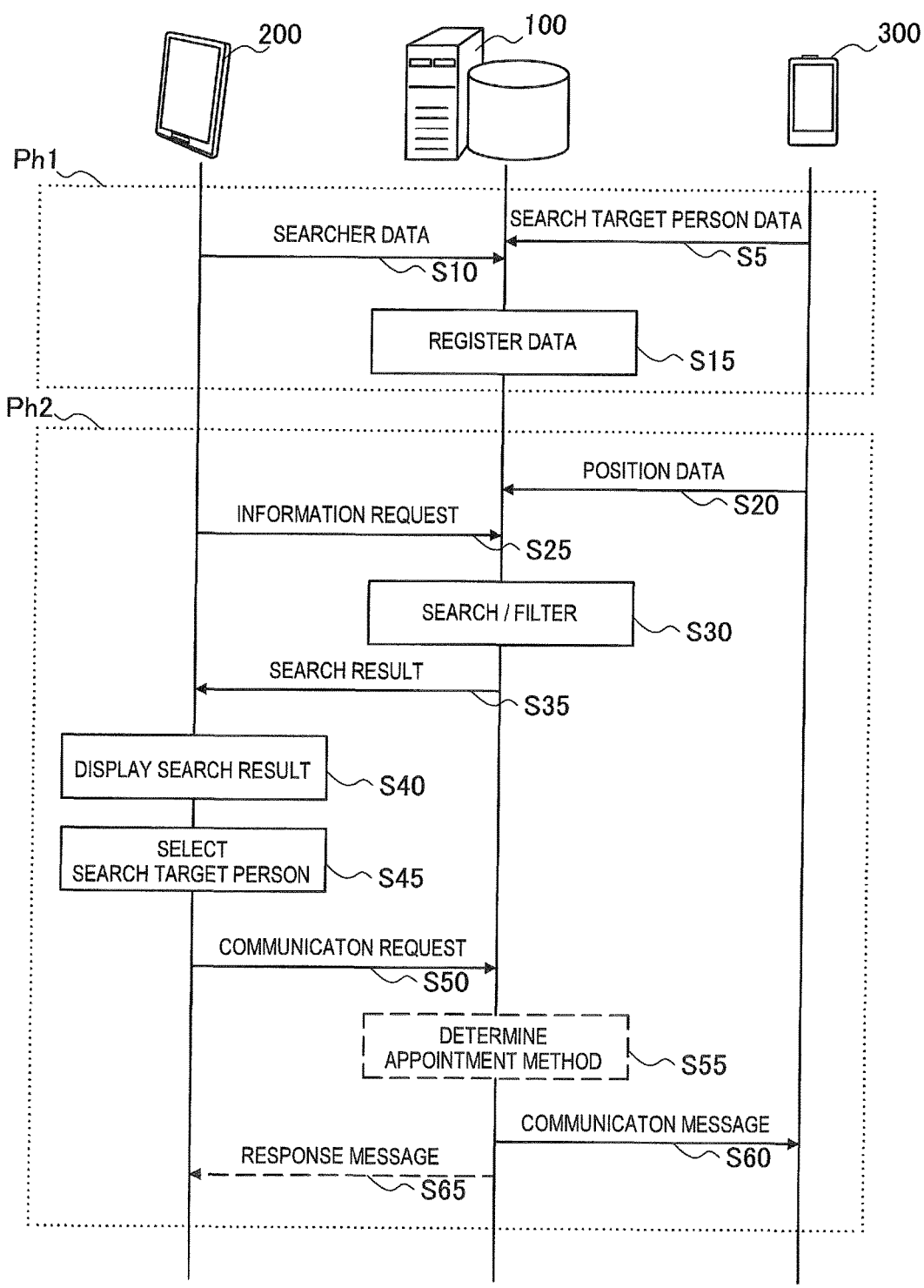
FIG. 2 is a first half of a sequence diagram illustrating an example of a process flow in a typical use.
Figure 3:
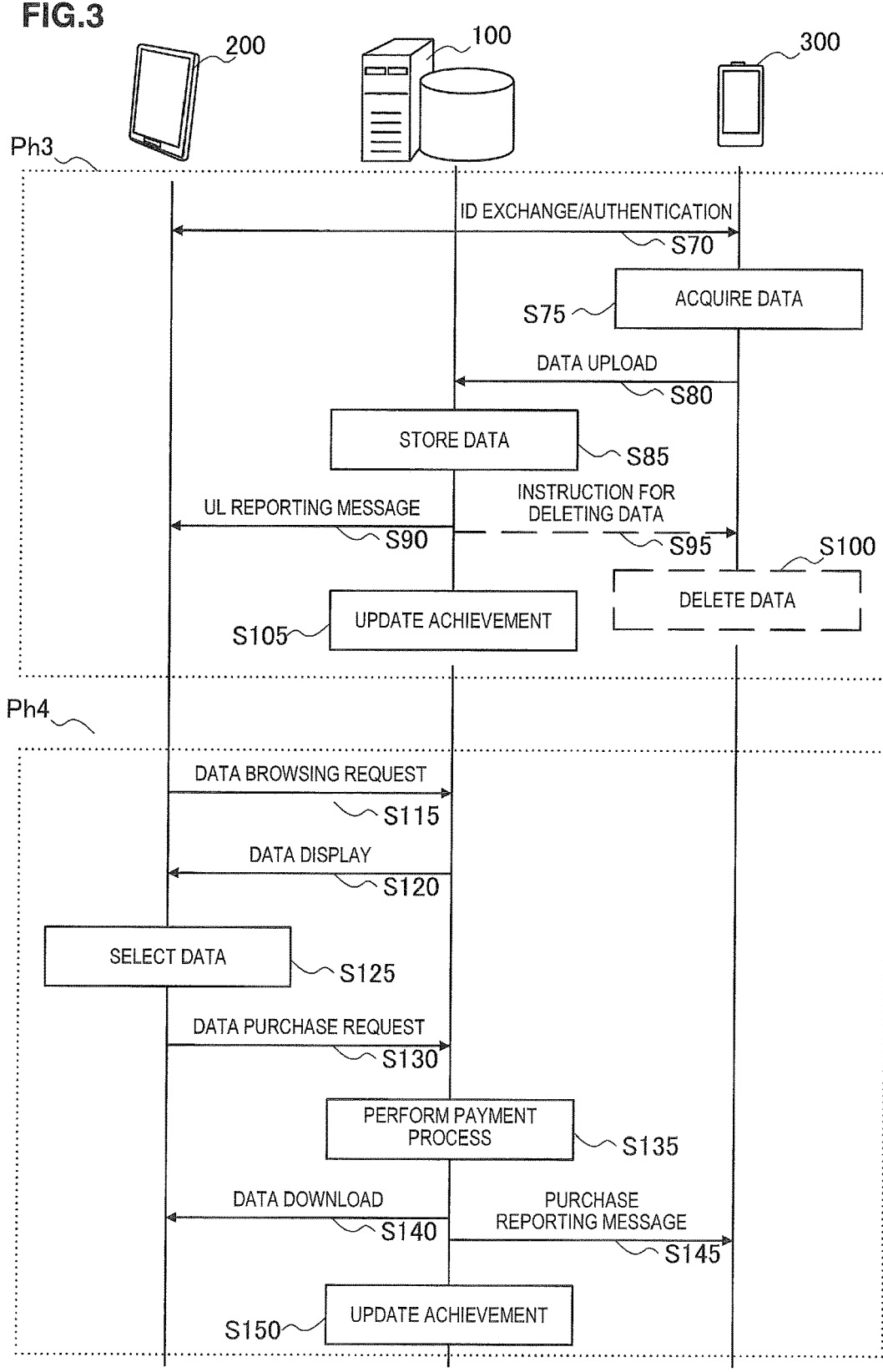
FIG. 3 is a second half of the sequence diagram illustrating the example of the process flow in the typical use.

FIGS. 2 and 3 are each a sequence diagram illustrating an example of a process flow in the case where the information processing system 1 is used for a photographing service, which is a typical use. The process sequences illustrated in FIGS. 2 and 3 are divided into four phases Ph1, Ph2, Ph3, and Ph4, which are surrounded by dotted frames. The phase Ph1 is a preregistration phase. The phase Ph2 is a search phase. The phase Ph3 is a data upload phase. The phase Ph4 is a purchase phase.

The server apparatus 100 accepts the registration of searcher data and search target person data in the preregistration phase Ph1. For example, the search target person terminal 300 (or another information processing apparatus) transmits the search target person data to the server apparatus 100 (step S5). The search target person data transmitted here may include identification information, face image data, attribute data, and model data of a search target person (candidate for a photographer). The searcher terminal 200 (or another information processing apparatus) also transmits the searcher data to the server apparatus 100 (step S10). The searcher data transmitted here may include identification information of a searcher. Additionally, the identification information may not be transmitted from each terminal apparatus, but may be issued to each terminal apparatus by the server apparatus 100 instead. The server apparatus 100 registers each of the received search target person data and searcher data in a database (step S15).

The search target person terminal 300 of each search target person periodically performs positioning, and transmits position data indicating a current position of the search target person to the server apparatus 100 in the search phase Ph2 (step S20). The server apparatus 100 updates position data of the search target person held in the database by use of the position data received from the search target person terminal 300. When encountering a scene in which the searcher desires to take a photograph, the searcher operates the searcher terminal 200. An information request is hereby transmitted from the searcher terminal 200 to the server apparatus 100 (step S25). The server apparatus 100 searches the database in response to the information request from the searcher terminal 200 (step S30), and provides position data of the search target person to the searcher terminal 200 as the search result (step S35). The search result is typically filtered on the basis of a current position of a searcher that may be indicated by the information request, and a search target person positioned farther than a distant that allows the searcher to meet the search target person is excluded from the search result.

The searcher terminal 200 causes a screen to display position data of at least one search target person, which is acquired from the server apparatus 100 (step S40). The searcher terminal 200 causes a searcher to select a search target person on the basis of the position data (step S45). The server apparatus 100 may additionally provide the searcher terminal 200 with search target person data that assists the searcher in selecting a search target person. For example, search target person data provided in a photographing service use may include face image data, attribute data, model data (model of cameras and lenses), and achievement data (such as the number of photographs that have been previously taken, a rank, and recording) of the search target person. When the searcher, who browses those kinds of data on the screen, selects a search target person from whom the searcher desires to be provided a service, the searcher terminal 200 transmits a communication request for requesting communication with the search target person to the server apparatus 100 (step S50). The server apparatus 100 transmits a communication message to the search target person terminal 300 of the search target person (who will be referred to as the photographer, hereinafter) who has been selected in response to the communication request from the searcher terminal 200 (step S60). For example, the server apparatus 100 may determine an appointment method (such as an appointed place and time) for both of the searcher and the photographer, on the basis of current positions of the searcher and the photographer (and, for example, position information of a neighboring landmark) (step S55). Instead, the appointment method may be proposed by the searcher. The communication message that is transmitted to the search target person terminal 300 may include identification information of the searcher and an explanation of the appointment method. A response message responding to the communication request may be further transmitted from the server apparatus 100 to the searcher terminal 200 (step S65).

When the searcher meets the photographer, identification information (ID) is exchanged and authentication is performed between the searcher terminal 200 and the search target person terminal 300 of the photographer in the data upload phase Ph3 (step S70). The authentication here purposes identity verification. Unidirectional authentication or bidirectional authentication may be used. Authentication may be performed, for example, through a near field communication module based on near field communication (NFC) or Bluetooth (registered trademark), or an easier technique such as reading a two-dimensional barcode (such as QR code (registered trademark). When authentication is successfully performed, the photographer takes a photograph in accordance with the searcher's desire. The photograph taken here may be any type of photographs such as a portrait photograph and a scenery photograph. The search target person terminal 300 of the photographer acquires image data of the taken photograph from a camera (step S75), and uploads the acquired image data to the server apparatus 100 along with the identification information of the searcher (step S80). Instead of the identification information of the search target person, service identification information, which is assigned for each photographing service, may be used. The server apparatus 100 stores the image data uploaded from the search target person terminal 300 (step S85), and transmits an upload (UL) reporting message to the searcher terminal 200. The server apparatus 100 may also issue an instruction to the search target person terminal 300 to delete the image data (step S95). The search target person terminal 300 may delete the uploaded image data from the search target person terminal 300 and the camera in response to the instruction from the server apparatus 100 (step S100). If the searcher permits the search target person to keep the image data (which is determined through predefined setting or for each service), the image data may not be deleted. The server apparatus 100 also uploads the achievement data of the photographer (step S105).

The searcher terminal 200 transmits a data browsing request to the server apparatus 100 in the purchase phase Ph4 (step S115). The server apparatus 100 causes a screen of the searcher terminal 200 to display image data of a photograph taken at the time when the searcher has previously received a photographing service, in response to the data browsing request from the researcher terminal 200 (step S120). The searcher browses the photograph displayed on the screen of the searcher terminal 200, and selects image data (which corresponds to downloading digital data in the present process sequence) that the searcher desires to purchase (the printed photograph may be purchased) (step S125). The searcher terminal 200 transmits a data purchase request to the server apparatus 100 (step S130). The server apparatus 100 performs a payment process in response to the data purchase request from the searcher terminal 200 (step S135), and allows the searcher terminal 200 to download the image data of the purchased photograph (step S140). The server apparatus 100 transmits, to the search target person terminal 300, a purchase reporting message for reporting to the photographer that the photograph has been purchased (step S145). The server apparatus 100 updates the achievement data of the photographer (step S150).

The above-described communication of the server apparatus 100 with the searcher terminal 200 and the search target person terminal 300 may be typically performed in a secure environment by use of a protocol such as Secure Sockets Layer (SSL). Specific configuration examples of these apparatuses will be described in the following sections in detail.

2. Configuration Example of Server Apparatus

[2-1. Hardware Configuration Example]

Figure 4:
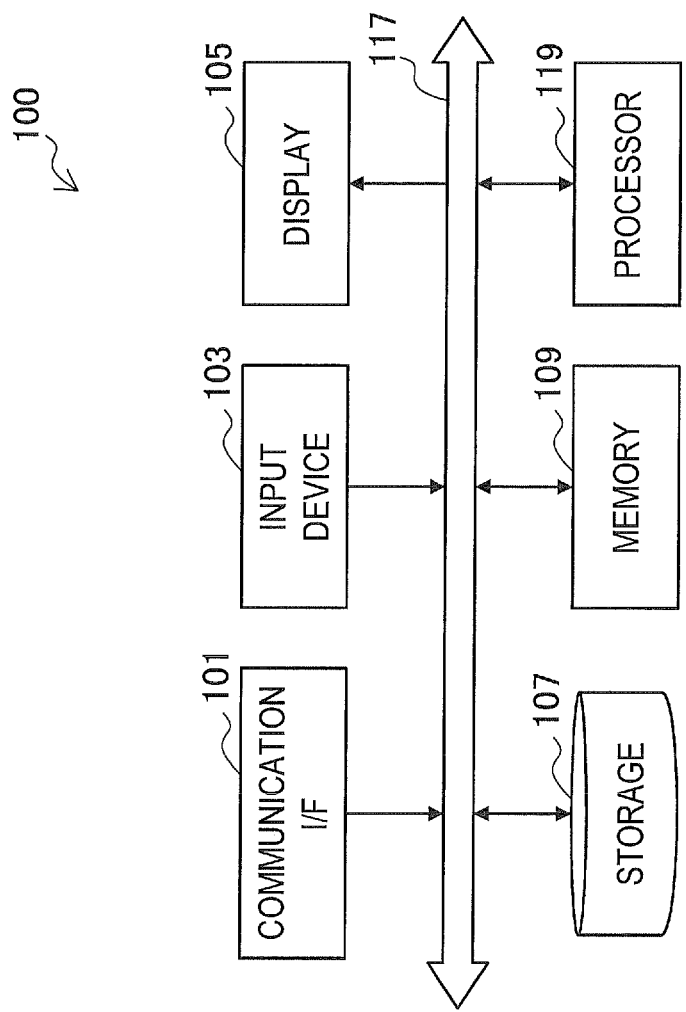
FIG. 4 is a block diagram illustrating a hardware configuration example of a server apparatus according to an embodiment.

FIG. 4 is a block diagram illustrating a hardware configuration example of the server apparatus 100. With reference to FIG. 4, the server apparatus 100 includes a communication interface (I/F) 101, an input device 103, a display 105, a storage 107, a memory 109, a bus 117, and a processor 119.

(1) Communication Interface

The communication I/F 101 supports a given wireless communication protocol or wired communication protocol. The communication I/F 101 establishes communication connection between the searcher terminal 200 and the search target person terminal 300 in the present embodiment.

(2) Input Device

The input device 103 is used for an operator of the server apparatus 100 to operate the server apparatus 100. The input device 103 may include, for example, a keyboard and a pointing device.

(3) Display

The display 105 is equipped with a display including, for example, a liquid crystal display (LCD), an organic light-emitting diode (OLED), or a cathode ray tube (CRT).

(4) Storage

The storage 107 includes a mass storage medium such as a hard disk, and stores various kinds of data in a database of the server apparatus 100. As described below, two databases (DB) of a search database and a service database are constructed in the storage 107 in the present embodiment.

(5) Memory

The memory 109 may be a semiconductor memory that may include random access memory (RAM) and read only memory (ROM). The memory 109 stores a program and data for a process performed by the server apparatus 100. The program is, for example, stored in advance in a storage medium (non-transitory medium) that is installed inside or outside each apparatus, read into the RAM upon execution, and executed by the processor 119.

(6) Bus

The bus 117 connects the communication I/F 101, the input device 103, the display 105, the storage 107, the memory 109, and the processor 119 to each other.

(7) Processor

The processor 119 may be, for example, a central processing unit (CPU) or a digital signal processor (DSP). The processor 119 executes a program stored in the memory 109 or another storage medium to operate various functions of the server apparatus 100, which will be described below.

[2-2. Configuration Example of Logical Function]

Figure 5:
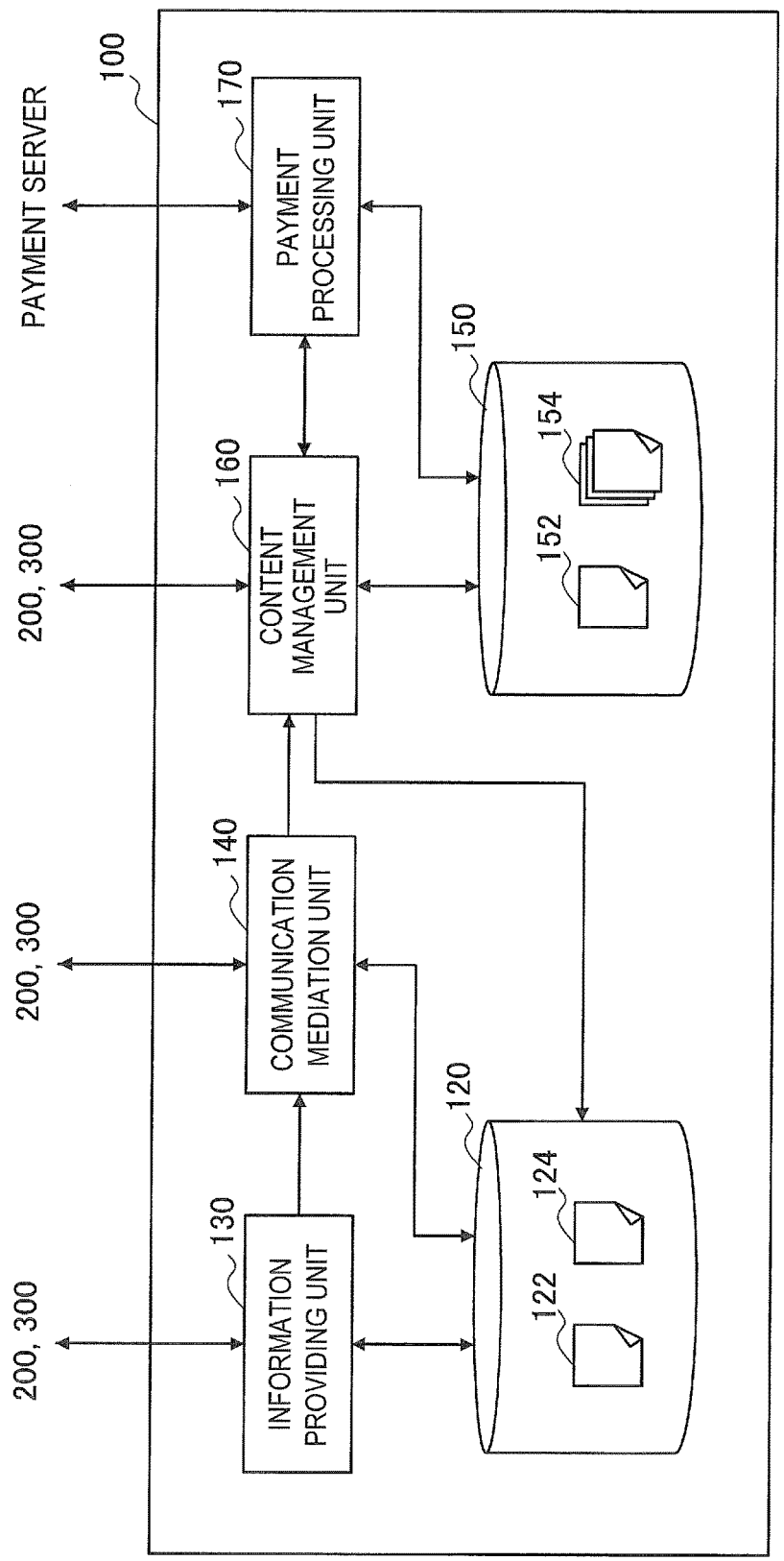
FIG. 5 is a block diagram illustrating a configuration example of a logical function of a server apparatus according to an embodiment.

FIG. 5 is a block diagram illustrating a configuration example of a logical function that is realized by the storage 107, the memory 109, and the processor 119 of the server apparatus 100, which have been illustrated in FIG. 4. With reference to FIG. 5, the server apparatus 100 includes a search DB 120, an information providing unit 130, a communication mediation unit 140, a service DB 150, a content management unit 160, and a payment processing unit 170.

(1) Search DB

The search DB 120 holds data regarding a search target person, who is a service provider, and a searcher, who is a user using a service. The search DB 120 stores search target person data 122 and searcher data 124 in the present embodiment. The search target person data 122 and the searcher data 124 may include data collected in the preregistration phase Ph1, and position data automatically updated in the search phase Ph2, which have been illustrated in FIG. 2, and achievement data that may be updated in the data upload phase Ph3 and the purchase phase Ph4, which have been illustrated in FIG. 3.

FIG. 6 is an explanatory diagram illustrating a configuration example of the search target person data 122. With reference to FIG. 6, the search target person data 122 includes fourteen data items of "photographer ID," "nickname," "sex," "mail address," "profile image," "speciality," "used model," "number of uploaded photographs," "rating," "rank," "special note," "status," "current position," and "moving range."

The "photographer ID" is identification information used for uniquely identifying a search target person who is a candidate for a photographer. The "nickname" is a name of a search target person, which may be displayed on a screen or written in a message. The "sex" indicates sex (Male/Female) of each search target person. The "mail address" indicates a destination address that may be used when a message is transmitted to each search target person. The "profile image" is a data item used for storing image data such as a face image representing an outer appearance of each search target person. The "speciality" indicates a category of photographing that each search target person is good at. The "speciality" is further divided into multiple sub-data items A1, A2, . . . in the example of FIG. 6. For example, the sub-data items A1 and A2 may correspond to "portrait photograph" and "scenery photograph," respectively. In this case, a search target person P01 whose sub-data item A1 has "○" indicates that the search target person P01 is good at taking a portrait photograph. The "used model" is a data item used for identifying a model that each search target person uses for taking a photograph. The "used model" is further divided into two sub-data items of "camera" and "lens" in the example of FIG. 6. The "camera" may indicate the model number of a camera that is used, while the "lens" may indicates the model number of at least one lens that is used.

The "number of uploaded photographs," "rating," "rank," and "special note" are included in achievement data of each search target person. The "number of uploaded photographs" indicates the number of photographs that each search target person has uploaded to the server apparatus 100. The "rating" indicates an evaluation score (such as a five-grade value from one to five) regarding each search target person, which is based on evaluation that may be input by a searcher who has selected each search target person as a photographer and used a service, for example. The "rank" indicates a ranking for an evaluation score of each search target person in multiple search target people. The "special note" is a data item used for storing a special memorandum for each search target person. The "special note" may include, for example, a rank that each search target person has previously recorded, an award that each search target person has previously received, or a special event (such as a photographing session held by an entrepreneur who manages the platform) in which each search target person has previously participated.

The "status" indicates whether a service provided by each search target person is currently available. Each search target person may, for example, provide a service only in a specific period of time on a preregistered date or day of the week. The "status" may be settable by each search target person via a user interface on the search target person terminal 300. The "current position" indicates a current position of each search target person, which is updated on the basis of position data that is periodically received from the search target person terminal 300 in the search phase Ph2. The "current position" may typically include latitude and longitude of each geographical position of a search target person. The "moving range" may indicate a range in which each search target person may move from a current position when a service is provided, for example, in the form of a value of a circle radius.

FIG. 7 is an explanatory diagram illustrating a configuration example of the searcher data 124. With reference to FIG. 7, the searcher data 124 includes seven data items of "user ID," "nickname," "sex," "mail address," "default search condition," "service use count," and "number of purchased photographs."

The "user ID" is identification information used for uniquely identifying a user, who is a searcher. The "nickname" is a name of each searcher, which may be displayed on a screen or written in a message. The "sex" indicates sex of each searcher. The "mail address" indicates a destination address that may be used when a message is transmitted to each searcher. The "default search condition" indicates a default search condition that may be applied to a search requested by each searcher. The "default search condition" is further divided into multiple sub-date items (such as "sex") in the example of FIG. 7. For example, a search target person is not filtered owing to his/her sex in a search requested by a searcher U01 whose sub-data item "sex" is "any." To the contrary, a search target person is filtered such that only a female search target person is included in the search result in a search requested by a searcher U02 whose sub-data item "sex" is "F: Female." The "service use count" indicates how many times each searcher has actually used a service through the present platform. The "number of purchased photographs" indicates the number of photographs that each searcher has previously purchased through the present platform.

Additionally, the configurations of the search target person data 122 and the searcher data 124 described here are just examples. A part of the above-described data items may be omitted. Alternatively, an additional data item may also be adopted. The search DB 120 may hold another type of data (such as an authentication data including a password of each user).

(2) Information Providing Unit

The information providing unit 130 registers the above-described various kinds of data collected from the searcher terminal 200 and the search target person terminal 300 in the search DB 120 in the preregistration phase Ph1. The information providing unit 130 also updates a "current position" in the search target person data 122 by use of position data transmitted from the search target person terminal 300 in the search phase Ph2. The information providing unit 130 provides position data indicating a current position of at least one search target person to the searcher terminal 200 in response to an information request from the searcher terminal 200. Position data regarding all available search target people included in the search target person data 122 may be provided to the searcher terminal 200 in a special use (such as providing information in a single sightseeing spot or amusement park) where a target geographical range of the present platform is limited to a narrow range. However, an information request from the searcher terminal 200 indicates a current position of the searcher in the other general uses, and the information providing unit 130 may provide the searcher terminal 200 with position data regarding a search target person who is to be filtered on the basis of the current position of the searcher. In this case, a search target person positioned farther than a (predefined or dynamically calculated) distance that allows the searcher to meet the search target person may be excluded from the search result.

The information providing unit 130 may also filter a search target person on the basis of not only current positions of a searcher and the search target person, but also another data item included in the search target person data 122. A search condition for filtering may be registered in the searcher data 124 in advance as a default search condition. Alternatively, a search condition for filtering may also be indicated by an information request designated by a searcher for each search. The information providing unit 130 may apply the search condition to the search target person data 122, and provide the searcher terminal 200 with position data regarding only a search target person who satisfies the search condition.

The information providing unit 130 transmits search target person data that assists a searcher in selecting a search target person to the searcher terminal 200 along with position data that is provided to the searcher terminal 200 in response to an information request in the present embodiment. The search target person data transmitted here may include at least one of face image data, attribute data, model data, and achievement data of each search target person, which are included in a search result.

A search result that may be provided from the information providing unit 130 to the searcher terminal 200 may be modified into a map or a list by the information providing unit 130, and be transmitted to the searcher terminal 200 in the present embodiment.

FIG. 8 is an explanatory diagram illustrating an example of a map that may be displayed as a search result. FIG. 8 illustrates a map window W1. Several display objects are plotted on a map of the real world around a current position of a searcher in the map window W1. A pin icon C10 disposed at the center of the window indicates the current position of the searcher. Camera icons C11, C12, C13, C14, and C15 disposed on the map each indicate a current position of a search target person who is a candidate for a photographer. Circular arcs superimposed on areas around the camera icons represent moving ranges of the search target people corresponding to the respective camera icons. A radius of each circle may be indicated by the data item "moving range" in the search target person data 122. For example, when the searcher taps the camera icon C11 on a screen of the searcher terminal 200, a balloon A11 indicating a part of schematic data regarding a search target person P02 ("Rachel," see FIG. 6) corresponding to the camera icon C11 is superimposed on the map. When the searcher selects the search target person P02 as a photographer, that selection may be decided via the camera icon C11 or the balloon A11. The searcher may display the following list on the screen by tapping a button B1 disposed at the upper right of the map window W1.

FIG. 9 is an explanatory diagram illustrating an example of a list that may be displayed as a search result. FIG. 9 illustrates a list window W2. Three search target people who may correspond to the respective camera icons C11, C12, and C13 illustrated in FIG. 8 are listed as candidates for photographers in the list window W2. Each column includes a face image, a nickname, attribute data (such as sex, age, and speciality), achievement data (such as a rank, the number of uploaded photographs, and a special note), and model data of each search target person. Star icons the number of which corresponds to rating of each search target person are attached to the face image. Reference images for a camera and a lens used by the search target person, and a label (such as "Zoom") indicating a characteristic of that camera model are attached to the model data. A searcher can take such various kinds of information into consideration to select a photographer suitable for the searcher.

(3) Communication Mediation Unit

When a searcher selects a search target person on the basis of position data (and other search target person data) provided by the information providing unit 130, the searcher terminal 200 transmits, to the sever apparatus 100, a communication request for requesting communication with the selected search target person, who is namely a photographer. The communication mediation unit 140 receives the communication request from the searcher terminal 200 via the communication I/F 101, and transmits a communication message to the search target person terminal 300 of the photographer.

The communication mediation unit 140 may determine an appointment method (such as an appointed place and time) for both of the searcher and the photographer on the basis of current positions (and, for example, position information of a neighboring landmark) of the searcher and the photographer. For example, JP 2011-34200A discloses a technique for determining an appointed place optimal for multiple users. The communication mediation unit 140 may determine an appointment method with this technique. Instead, the appointment method may be proposed by the searcher. The communication message that is transmitted to the search target person terminal 300 may include identification information of the searcher and an explanation of the appointment method.

For example, if an agreement message indicating that the photographer agrees to provide a service is received as a response to the communication message, the communication mediation unit 140 transmits a response message responding to the communication request to the searcher terminal 200. If the photographer refuses to provide a service, or if an agreement message is not received within a given time, a response message that prompts the searcher to select another search target person may be transmitted to the searcher terminal 200.

(4) Service DB

When the communication mediation unit 140 successfully mediates communication between the searcher and the photographer, the communication mediation unit 140 generates a new entry in service providing data 152 in the service DB 150. The service DB 150 holds data regarding a service between a searcher and a search target person, who are introduced in the present platform. The service DB 150 stores the service providing data 152 and content data 154 in the present embodiment.

FIG. 10 is an explanatory diagram illustrating a configuration example of the service providing data 152. With reference to FIG. 10, the service providing data 152 includes eight data items of "service ID," "user ID," "photographer ID," "date and time," "place," "service status," "number of uploaded photographs," and "rating."

The "service ID" is identification information used for uniquely identifying each service. The "user ID" is identification information used for identifying a searcher who uses each service. The "photographer ID" is identification information used for identifying a search target person who provides each service. The "date and time" indicates an approximate date and time when each service has been provided (or when an entry has been generated). The "place" indicates a place where each service has been provided (or an appointed place). The "service status" indicates to what extent each service is provided. For example, the "service status" may include a value obtained "before a service," a value obtained "after data is uploaded," and a value obtained "after the payment." The "number of uploaded photographs" indicates the number of photographs that a search target person has uploaded to the server apparatus 100 in each service. The "rating" indicates evaluation regarding an uploaded photograph or a search target person, which may be input by a searcher for each service.

The content data 154 includes image data of at least one photograph that is uploaded from the search target person terminal 300 to the server apparatus 100. The content data 154 is managed by the following content management unit 160.

(5) Content Management Unit

Image data of a photograph taken by a search target person is uploaded from the search target person terminal 300, to which a communication message is transmitted. The content management unit 160 receives the image data via the communication I/F 101, and stores the received image data in the service DB 150. The image data may be further categorized for each service on the basis of each searcher who has used the service. The content management unit 160 imposes a limitation on access to the image data stored in the service DB 150 to allow the searcher who has used the service to access the image data of a photograph taken in the service. The content management unit 160 uses, for example, an ID/password authentication scheme to impose a limitation on access to a content browsing window for each user. The content management unit 160 prohibits a photograph that is taken for a certain searcher from being browsed by a user other than that searcher.

The photographer who has taken that photograph is also prohibited from browsing the photograph in principle. Consequently, the searcher does not have to be worried that the photograph in which the searcher is shown might be utilized by another person, and the present platform would be used more. After the image data received from the search target person terminal 300 is successfully stored in the service DB 150, the content management unit 160 may issue an instruction to the search target person terminal 300 to delete the original data of the image data in order to reinforce that advantage. Additionally, if the searcher permits the photographer to keep the image data, the content management unit 160 does not issue an instruction to delete the image data. In this case, the content management unit 160 may allow the photographer who takes the photograph to browse the photograph.

As described above, the content management unit 160 provides the searcher terminal 200 with a content browsing window for allowing a searcher who has used a service to browse a photograph taken in the service. The content browsing window also plays a role of allowing the searcher to purchase the image data.

Figure 11:
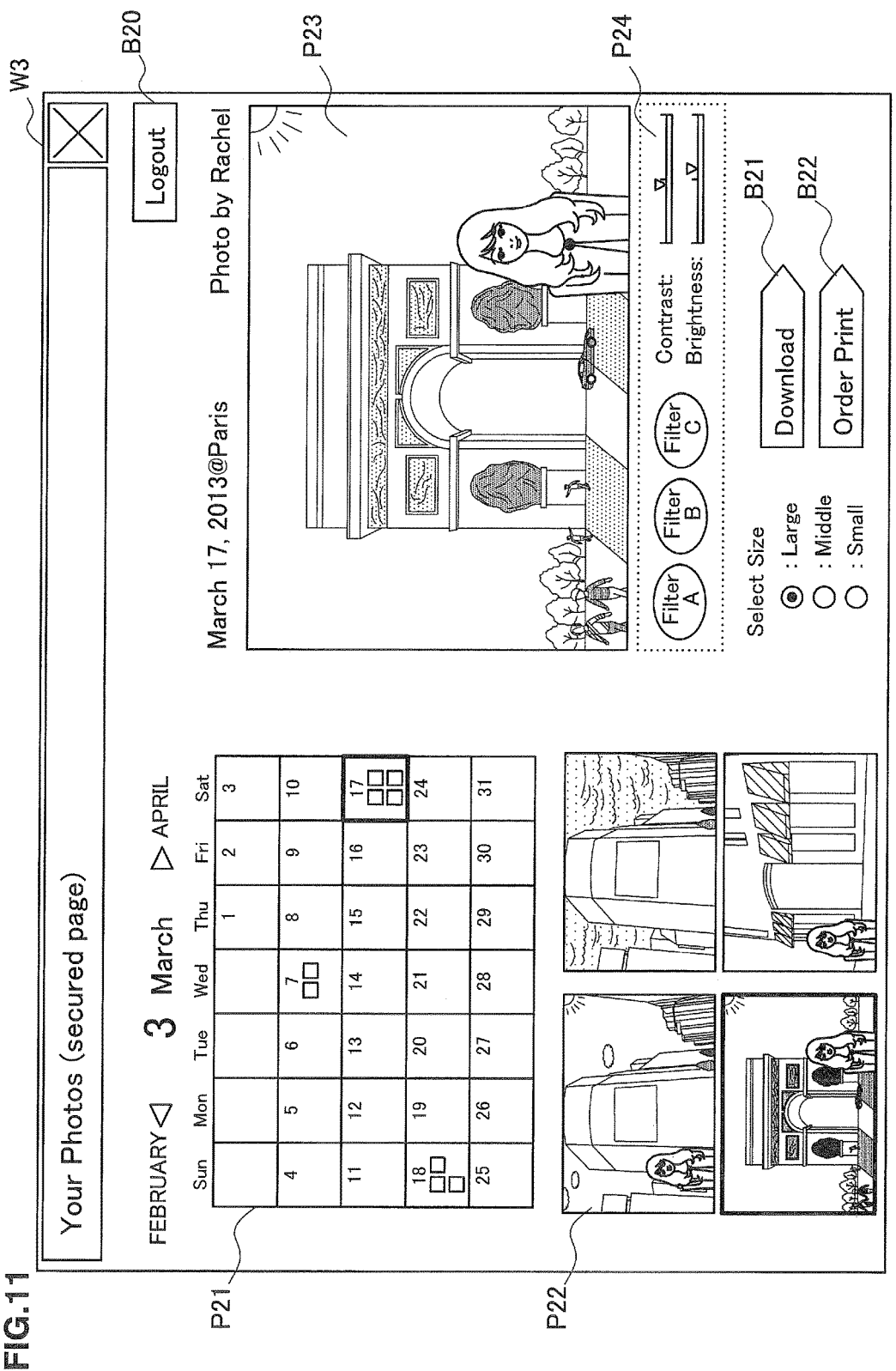
FIG. 11 is an explanatory diagram illustrating an example of a content browsing window.

FIG. 11 illustrates a content browsing window W3 as an example. The content browsing window W3 includes a date selection region P21 disposed at the upper left, an image selection region P22 disposed at the lower left, a selected image display region P23 disposed at the upper right, and an adjustment region P24 disposed at the lower right in the example of FIG. 11. For example, a searcher can adjust a characteristic such as contrast, brightness, and a color tone of an image displayed in the selected image display region P23 by using a tool in the adjustment region P24. A searcher operates buttons B21 and B22 disposed below the adjustment region P24 when the searcher purchases image data. The searcher can change a window to download the image data by operating the button B21, and change a window to order photograph print by operating the button B22. The content management unit 160 provides the content browsing window W3 in a secure environment using, for example, Hypertext Transfer Protocol over Secure Socket Layer (HTTPS). A button B20 disposed at the upper right of the content browsing window W3 is pushed down when the searcher logs out from a secure environment for the searcher.

When a data purchase request for image data selected by a searcher via a window as illustrated in FIG. 11 is received, the content management unit 160 issues a payment instruction to the payment processing unit 170. If the payment is successfully completed, the management unit 160 allows the searcher terminal 200 to download the image data or order photograph print. The content management unit 160 also transmits, to the search target person terminal 300, a purchase reporting message for reporting to the photographer that the image data has been purchased.

The content management unit 160 additionally updates the achievement data and the status regarding the service provided by search target person. For example, when the content management unit 160 stores the image data received from the search target person terminal 300 in the service DB 150, the content management unit 160 adds the number of stored pieces of image data to a value of the "number of uploaded photographs" in the service providing data 152 and updates the service status as a "service status "after data is uploaded." In addition, the content management unit 160 also updates a value of the "number of uploaded photographs" in the search target person data 122. When the searcher purchases the image data, the content management unit 160 further uploads the achievement data regarding the search target person, who is a photographer of the purchased image. The achievement data updated here may include the "rating" and the "rank" in the search target person data 122.

(6) Payment Processing Unit

The payment processing unit 170 performs a payment process for image data that has been purchased in response to an instruction from the content management unit 160. The payment process here may be performed with a general payment service provided from a bank or a credit card company. When a payment process is completed, the payment processing unit 170 informs the content management unit 160 whether the payment process succeeds or fails.

3. Configuration Example of Searcher Terminal

[3-1. Hardware Configuration Example]

Figure 12:
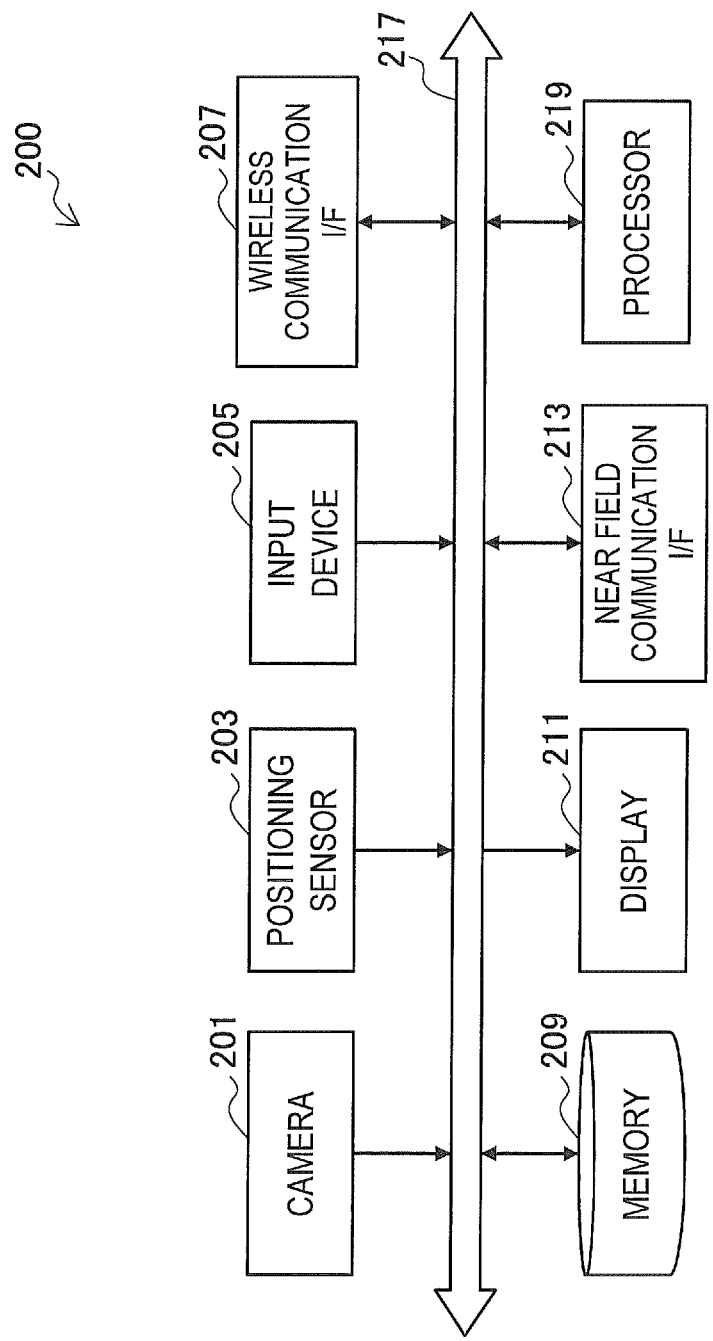
FIG. 12 is a block diagram illustrating a hardware configuration example of a searcher terminal according to an embodiment.

FIG. 12 is a block diagram illustrating a hardware configuration example of the searcher terminal 200. With reference to FIG. 12, the searcher terminal 200 includes a camera 201, a positioning sensor 203, an input device 205, a wireless communication I/F 207, a memory 209, a display 211, a near field communication I/F 213, a bus 217, and a processor 219.

(1) Camera

The camera 201 includes an image sensor such as a charge coupled device (CCD) and a complementary metal oxide semiconductor (CMOS). However, functionality of the camera 201 of the searcher terminal 200 is lower than functionality of a camera owned by a search target person in most cases.

(2) Positioning Sensor

The positioning sensor 203 performs positioning on a geographical position of the searcher terminal 200. For example, the positioning sensor 203 may be a GPS sensor that receives global positioning system (GPS) signals to measure latitude, longitude, and altitude. The positioning sensor 203 may also be a radio-based positioning module that measures a position on the basis of wireless signals transmitted and received to and from a wireless access point. The positioning sensor 203 outputs position data indicating a current position of a searcher as the positioning result.

(3) Input Device

The input device 205 is used for a searcher to operate the searcher terminal 200. The input device 205 may include, for example, a touch sensor, a button, a switch, or a keypad.

(4) Wireless Communication I/F

The wireless communication I/F 207 supports a given wireless communication protocol. The wireless communication I/F 207 establishes communication connection between the searcher terminal 200 and the server apparatus 100.

(5) Memory

The memory 209 includes a storage medium such as a semiconductor memory and a hard disk, and stores a program and data for a process performed by the searcher terminal 200. The data stored by the memory 209 may include, for example, identification information of a searcher. Additionally, a part or all of the program and data described in the present section may not be stored by the memory 209, but may be acquired from an external data source (such as a data server, a network storage, and an external memory).

(6) Display

The display 211 is equipped with a screen including, for example, an LCD or an OLED, and displays an image generated by the searcher terminal 200. For example, the screen of the display 211 may display the map window W1, the list window W2, and the content browsing window W3, which have been described above.

(7) Near Field Communication I/F

The near field communication I/F 213 supports a near field communication protocol such as NFC and Bluetooth (registered trademark). The near field communication I/F 213 may be used, for example, when identification information is transmitted or received for authentication between the searcher terminal 200 and the search target person terminal 300.

(8) Bus

The bus 217 connects the camera 201, the positioning sensor 203, the input device 205, the wireless communication I/F 207, the memory 209, the display 211, the near field communication I/F 213, and the processor 219 to each other.

(9) Processor

The processor 219 may be, for example, a CPU or a DSP. The processor 219 executes a program stored in the memory 209 or another storage medium to operate various functions of the searcher terminal 200, which will be described below.

[3-2. Configuration Example of Logical Function]

Figure 13:
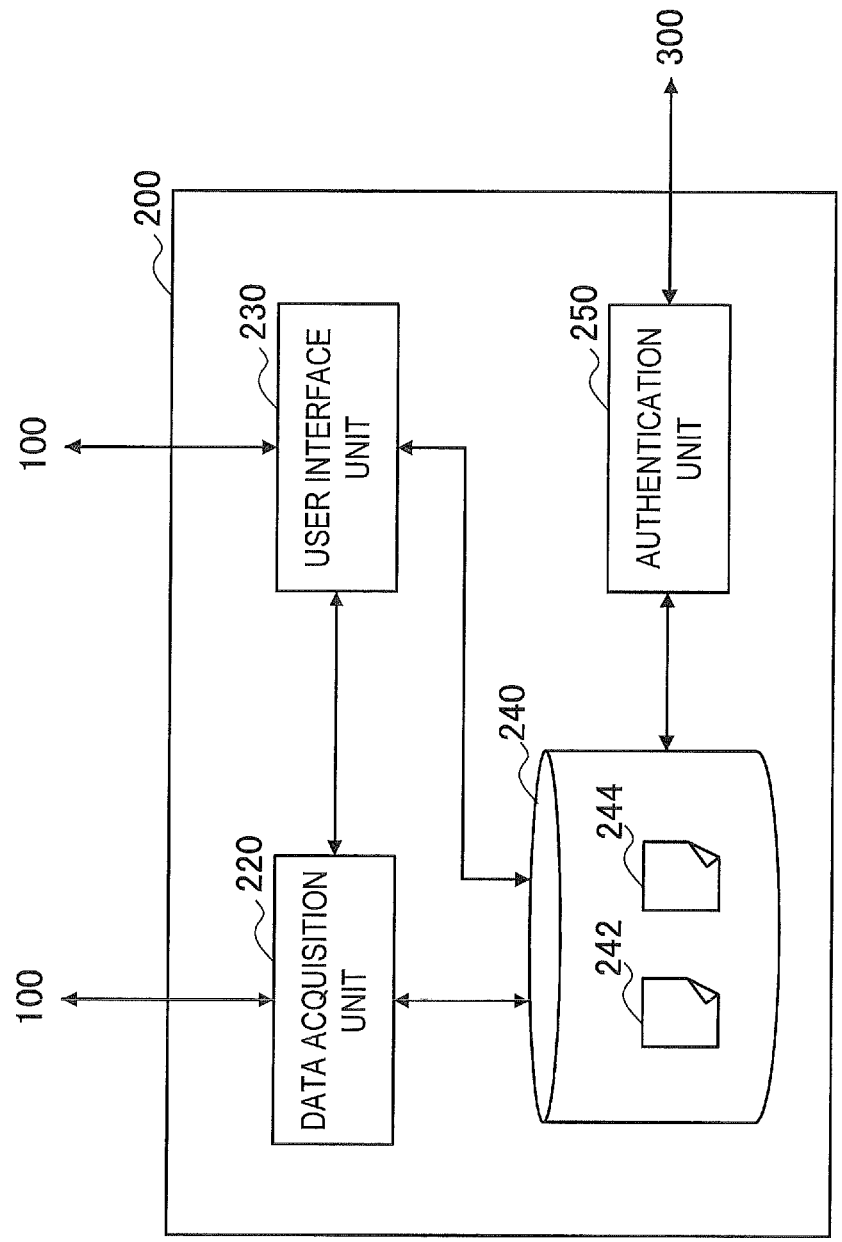
FIG. 13 is a block diagram illustrating a configuration example of a logical function of a searcher terminal according to an embodiment.

FIG. 13 is a block diagram illustrating a configuration example of a logical function that is realized by the memory 209 and the processor 219 of the searcher terminal 200, which have been illustrated in FIG. 12. With reference to FIG. 13, the searcher terminal 200 includes a data acquisition unit 220, a user interface unit 230, an information storage unit 240, and an authentication unit 250.

(1) Data Acquisition Unit

The server apparatus 100 includes a database regarding at least one search target person. The data acquisition unit 220 transmits an information request to the server apparatus 100 in response to a user input from a searcher. The information request may include position data regarding a current position of the searcher, which is output from the positioning sensor 203. The data acquisition unit 220 acquires a search result including position data indicating a current position of each search target person from the server apparatus 100. The position data acquired here may also be numeral value data indicating the current position of each search target person in the form of a numeral value, or may be a map indicating the current position of the search target person in the graphic form. The data acquisition unit 220 outputs the acquired search result to the user interface unit 230.

(2) User Interface Unit

The user interface unit 230 causes a screen of the display 211 to display the position data of the search target person, who is a candidate for a photographer, acquired from the data acquisition unit 220. For example, the map window W1 as illustrated in FIG. 8 may be displayed. The user interface unit 230 allows the searcher to select a preferable photographer on the basis of the displayed position data. The user interface unit 230 may cause the screen to further display search target person data such as face image data, attribute data, model data, and achievement data that may be provided from the server apparatus 100, in order to assist the searcher in selecting a photographer. For example, the balloon A11 as illustrated in FIG. 8 or the list window W2 as illustrated in FIG. 9 may be displayed.

When the searcher selects a photographer, the user interface unit 230 transmits a communication request for requesting communication with the search target person terminal 300 of the selected photographer to the server apparatus 100. The communication request may include identification information of the searcher, identification information of the selected photographer, and an explanation of an appointment method (such as time and a place) in the case where the searcher proposes the appointment method. When a response message is received as a response to the communication request, the user interface unit 230 causes the information storage unit 240 to store the identification information of the photographer, from whom the searcher is receiving a service later.

(3) Information Storage Unit

The information storage unit 240 stores identification information 242 of the searcher, which is transmitted to the server apparatus 100 in advance or issued from the server apparatus 100. Service use information 244 may include, for example, identification information and face image data (if necessary) of a photographer. The information storage unit 240 stores the service use information 244 for each service that the searcher receives. Such kinds of information may be used for identity verification between the searcher and the photographer at the start of the service.

(4) Authentication Unit

When a searcher meets a photographer in an appointment method that may be reported to the search target person terminal 300, the authentication unit 250 communicates with the search target person terminal 300 via the near field communication I/F 213 to perform an authentication process for identity verification. For example, the authentication unit 250 transmits identification information of the searcher, which is stored by the information storage unit 240, to the search target person terminal 300 to cause the search target person terminal 300 to confirm the authenticity. The authentication unit 250 may receive identification information of the photographer from the search target person terminal 300, and confirm the authenticity of the identification information of the photographer by comparing the received identification information with identification information of the photographer included in the service use information 244. Additionally, the searcher may also perform identity verification on the photographer by comparing the face of the photographer with a face image of the photographer instead of an authentication process performed by the authentication unit 250.

The function of the searcher terminal 200, which has been described in the present section, is chiefly used in the search phase Ph2 and the data upload phase Ph3. The user interface unit 230 may be used or an information processing apparatus other than the searcher terminal 200 may also be used to register searcher data in the server apparatus 100 in the preregistration phase Ph1, display image data, request to purchase the image data, and download the image data in the purchase phase Ph4.

Figure 14:
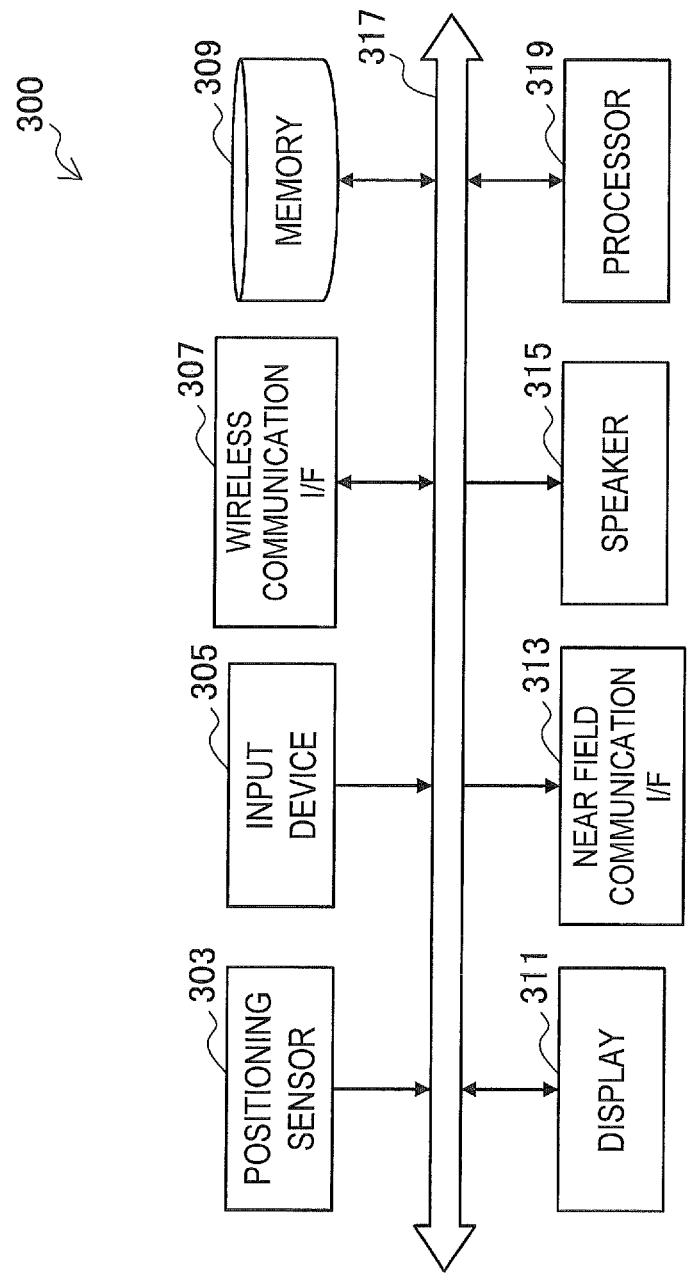
FIG. 14 is a block diagram illustrating a hardware configuration example of a search target person terminal according to an embodiment.

4. Configuration Example of Search Target Person Terminal 4-1. Hardware Configuration Example FIG. 14 is a block diagram illustrating a hardware configuration example of the search target person terminal 300. With reference to FIG. 14, the search target person terminal 300 includes a positioning sensor 303, an input device 305, a wireless communication I/F 307, a memory 309, a display 311, a near field communication I/F 313, a speaker 315, a bus 317, and a processor 319.

(1) Positioning Sensor

The positioning sensor 303 performs positioning on a geographical position of the search target person terminal 300. For example, the positioning sensor 303 may also be a GPS sensor or a radio-based positioning module. The positioning sensor 303 outputs position data indicating a current position of the search target person as a positioning result.

(2) Input Device

The input device 305 is used for a search target person to operate the search target person terminal 300. The input device 305 may include, for example, a touch sensor, a button, a switch, or a keypad.

(3) Wireless Communication I/F

The wireless communication I/F 307 supports a given wireless communication protocol. The wireless communication I/F 307 establishes communication connection between the search target person terminal 300 and the server apparatus 100.

(4) Memory

The memory 309 includes a storage medium such as a semiconductor memory and a hard disk, and stores a program and data for a process performed by the search target person terminal 300. The data stored by the memory 309 may include, for example, identification information of a search target person. Additionally, a part or all of the program and data described in the present section may not be stored by the memory 309, but may be acquired from an external data source.

(5) Display

The display 311 is equipped with a screen including, for example, an LCD or an OLED, and displays an image generated by the search target person terminal 300.

(6) Near Field Communication I/F

The near field communication I/F 313 supports a near field communication protocol such as NFC and Bluetooth (registered trademark). The near field communication I/F 313 may be used, for example, when identification information is transmitted or received for authentication between the search target person terminal 300 and the searcher terminal 200. The near field communication I/F 313 may also be used when image data is acquired from a camera owned by a search target person.

(7) Speaker

The speaker 315 is an audio output device that outputs a notification sound or a voice. For example, the speaker 315 outputs a notification sound in order to notify a search target person that a communication message has been received.

(8) Bus

The bus 317 connects the positioning sensor 303, the input device 305, the wireless communication I/F 307, the memory 309, the display 311, the near field communication I/F 313, the speaker 315, and the processor 319 to each other.

(9) Processor

The processor 319 may be, for example, a CPU or a DSP. The processor 319 executes a program stored by the memory 309 or another storage medium to operate various functions of the search target person terminal 300, which will be described below.

4-2. Configuration Example of Logical Function

FIG. 15 is a block diagram illustrating a configuration example of a logical function that is realized by the memory 309 and the processor 319 of the search target person terminal 300, which have been illustrated in FIG. 14. With reference to FIG. 15, the search target person terminal 300 includes a position transmission unit 320, a notification unit 330, an information storage unit 340, an authentication unit 350, and an image transmission unit 360.

(1) Position Transmission Unit

The position transmission unit 320 uses the positioning sensor 303 to periodically measure a current position of a search target person who carries the search target person terminal 300, and transmits position data indicating the current position to a server apparatus. The information storage unit 340 stores identification information of the search target person in advance, and the identification information of the search target person is attached to the position data that is transmitted by the position transmission unit 320.

(2) Notification Unit

When a user who desires to take a photograph selects a search target person carrying the search target person terminal 300 as a photographer in the search phase Ph2, the server apparatus 100 transmits, to the search target person terminal 300, a communication message indicating that the search target person has been selected as a photographer. The notification unit 330 receives the communication message from the server apparatus 100, and notifies the search target person that the communication message has been received. The speaker 315 may also output a notification sound to notify the search target person. Instead thereof (or in addition thereto), a vibrator may also vibrate, a message may be displayed on a screen of the display 311, or a lamp may be turned on to notify the search target person. The notification unit 330 may also send back, to the server apparatus 100, an agreement message indicating that the search target person agrees to provide a service or a refusal message indicating that the search target person refuses to provide a service.

(3) Information Storage Unit

The information storage unit 340 stores identification information 342 of a search target person that is transmitted to the server apparatus 100 in advance or issued from the server apparatus 100. The information storage unit 340 also stores identification information 344 of a searcher for each service provided by a search target person. Such kinds of identification information may be used for identity verification between the searcher and the search target person at the start of the service.

(4) Authentication Unit

When a searcher meets a search target person in an appointment method that may be reported by a communication message, the authentication unit 350 communicates with the searcher 200 via the near field communication I/F 313 to perform an authentication process for identity verification. For example, the authentication unit 350 may transmit the identification information 342 of the search target person, which is stored by the information storage unit 340, to the searcher terminal 200 to cause the searcher terminal 200 to confirm the authenticity. As described above, the searcher may also directly look at the face of the search target person to perform identity verification on the search target person (photographer). The authentication unit 350 may also receive identification information of a met searcher from the searcher terminal 200, and confirm the authenticity of the identification information of the searcher by comparing the received identification information with the identification information 344, which is stored in the information storage unit 340.

(5) Image Transmission Unit

After a service (of taking a photograph) is provided to a searcher by a search target person who has been selected as a photographer, the image transmission unit 360 acquires image data of the photograph taken for the searcher by a camera owned by the search target person from the camera, for example, via the near field communication I/F 313. The image transmission unit 360 uploads the acquired image data to the server apparatus 100 in association with the identification information 344 of the searcher.

When the searcher does not permit the search target person to keep the image data, the image transmission unit 360 deletes the image data stored in the camera of the search target person and the search target person terminal 300 in response to an instruction for deleting the data, which is received from the server apparatus 100.

4-3. Modified Example

FIG. 16 is an explanatory diagram for describing a modified example of a search target person terminal. With reference to FIG. 16, a search target person terminal 400 is illustrated as an example. The search target person terminal 400 is a chip built in a strap ST1 that is tied to a camera owned by a search target person Us. The search target person terminal 400 includes the positioning sensor 303, the wireless communication I/F 307, the memory 309, the near field communication I/F 313, the speaker 315, and the processor 319 (and a battery that is not illustrated in FIG. 14) of the modules in the search target person terminal 300, which have been illustrated in FIG. 14. As described with reference to FIG. 15, the processor 319 of the search target person terminal 400 operates a position transmission function, a notification function, an authentication function, and an image transmission function.

The strap ST1 having the search target person terminal 400 built therein is distributed by an entrepreneur managing the present platform, for example, to a search target person (such as a heavy user whose hobby is taking a photograph), who desires to provide a photographing service. A suspicious person may be excluded from search target people in the distribution procedure. When the strap ST1 is distributed, a small sum of money may be deposited from a search target person (the deposited money is returned to the search target person when the search target person returns the strap ST1 to the entrepreneur). A special mark or a string of characters (such as "photographer in your town") may be attached to the exterior of the strap ST 1, showing that a person wearing the strap ST1 is a search target person who provides a photographing service. Such a mechanism makes a user of the photographing service feel as secure as possible.

5. Conclusion

FIG. 17 is an explanatory diagram for describing a compound effect attained in each of the above-described embodiments. FIG. 17 illustrates the platform arranged at the center, which is realized by the information processing system 1, a service provider who uses the platform to provide a service, a customer who uses the platform to receive the provided service, and an entrepreneur who manages the platform.

A service provider is a search target person from a standpoint of an information search, and also a photographer from a standpoint of a photographing service. According to each of the above-described embodiments, if the service provider registers search target person data in the information processing system 1 and receives mediation, the service provider can acquire a lot of opportunities to provide a service without bearing costs to transmit the information. Increase in opportunities to utilize a high-end model owned by the service provider or a sophisticated skill of the service provider motivates the service provider very much. Furthermore, if a charge is imposed, the service provider can expect increase in his/her wages.

A customer is a searcher from a standpoint of an information search, and also a photographing requester from a standpoint of a photographing service. According to each of the above-described embodiments, when the customer desires to receive a service in an unplanned place or at unplanned timing, the customer can receive a desired high quality service by searching for a nearby service provider in the information processing system 1. The customer can take an attribute and achievement of a service provider into consideration to select the service provider. In addition, a method for identity verification is also prepared. Consequently, the customer feels secure to use a service. In addition, since communication may be mediated and data may also be transmitted and received in a secure environment after a photograph is taken, privacy of the customer is also protected.

An entrepreneur can stimulate a market of products related to a service by managing the present platform, and increase the number of sold products. The entrepreneur can directly increase profits by providing a service with a profit margin. The entrepreneur may grant a privilege opportunity to a service provider having a good achievement in the present platform. For example, it is conceivable for a photographer who has had high rating to be provided an opportunity to participate in a photo session in which a famous person also takes part. Such a privilege may increase the number of service providers to be registered in the database. Moreover, the service provider would invest in order to provide a higher quality service, and the market would be consequently stimulated more.

Additionally, the details of the embodiments have been described as photographing service uses. However, the technology according to one or more of embodiments of the present disclosure is not limited to the above-described examples. For example, the present technology may also be used for another service such as a video filming service, a music playing service, and a transportation service.

Although the preferred embodiments of the present disclosure have been described in detail with reference to the appended drawings, the present disclosure is not limited thereto. It is obvious to those skilled in the art that various modifications or variations are possible insofar as they are within the technical scope of the appended claims or the equivalents thereof. It should be understood that such modifications or variations are also within the technical scope of the present disclosure.

Additionally, the present technology may also be configured as below:

(1) An information processing apparatus including:

a database configured to store position data indicating a current position of at least one search target person, the position data being received from a communication apparatus of the at least one search target person;

an information providing unit configured to provide the position data of the at least one search target person to a terminal apparatus of a searcher in response to an information request from the terminal apparatus of the searcher; and a communication mediation unit configured to receive, from the terminal apparatus, a communication request for requesting communication with a search target person who is selected by the searcher based on the provided position data, and to transmit a communication message to a communication apparatus of the selected search target person.

(2) The information processing apparatus according to (1), wherein the information request indicates a current position of the searcher, and wherein the information providing unit provides the terminal apparatus with the position data of the at least one search target person filtered based on the current position of the searcher indicated by the information request.

(3) The information processing apparatus according to (1) or (2), wherein the database stores search target person data for each search target person, the search target person data assisting the searcher in selecting the search target person, and wherein the information providing unit provides the terminal apparatus with the search target person data of the at least one search target person along with the position data.

(4) The information processing apparatus according to (1) or (2), wherein the database stores search target person data for each search target person, the search target person data assisting the searcher in selecting the search target person, and wherein the information providing unit provides the terminal apparatus with the position data of the at least one search target person filtered by applying a search condition to the search target person data, the search condition being registered by the searcher in advance or indicated by the information request.

(5) The information processing apparatus according to (3) or (4), wherein the searcher is a user who desires to take a photograph, and wherein the search target person is a candidate for a photographer who takes a photograph for the user.

(6) The information processing apparatus according to (5), wherein the search target person data includes at least one of face image data, attribute data, model data, and achievement data of each search target person.

(7) The information processing apparatus according to any one of (1) to (6), wherein the information providing unit provides the terminal apparatus with the position data by transmitting, to the terminal apparatus, a map on which an icon corresponding to the current position of each search target person is plotted.

(8) The information processing apparatus according to (7), wherein the database further stores data indicating a moving range of each search target person, and wherein the information providing unit uses the data indicating the moving range to superimpose an object on the map, the object representing the moving range including the current position of each search target person.

(9) The information processing apparatus according to any one of (1) to (8), wherein the communication mediation unit transmits the communication message to the communication apparatus, the communication message indicating an appointed place for the selected search target person to meet the searcher.

(10) The information processing apparatus according to (5) or (6), further including:

a content management unit configured to receive an image shot by the search target person from the communication apparatus to which the communication message has been transmitted, and to allow the searcher to access the received image.

(11) The information processing apparatus according to (10), wherein the content management unit imposes a limitation on access of a user other than the searcher to the image.

(12) The information processing apparatus according to (10) or (11), wherein the content management unit allows the selected search target person to access the image when the searcher permits the selected search target person to access the image.

(13) The information processing apparatus according to any one of (10) to (12), wherein the content management unit issues an instruction to the communication apparatus to delete original data of the image received from the communication apparatus.

(14) The information processing apparatus according to any one of (10) to (13), wherein the content management unit causes the terminal apparatus of the searcher to display a window for allowing the searcher to purchase the image received from the communication apparatus.

(15) The information processing apparatus according to (14), wherein the database stores the search target person data for each search target person, the search target person data including achievement data regarding a service provided by the search target person, and wherein, when the searcher purchases the image, the content management unit updates the search target person data regarding the search target person who has shot the purchased image.

(16) An information processing method executed by an information processing apparatus, the information processing method including:

receiving position data from a communication apparatus of at least one search target person, the position data indicating a current position of the at least one search target person;

causing a database to store the received position data;

providing a terminal apparatus of a searcher with the position data of the at least one search target person in response to an information request from the terminal apparatus of the searcher, the position data being stored by the database;

receiving, from the terminal apparatus, a communication request for requesting communication with a search target person who is selected by the searcher based on the provided position data; and transmitting a communication message to a communication apparatus of the selected search target person.

(17) A program for causing a computer that controls an information processing apparatus accessible to a database storing position data which is received from a communication apparatus of at least one search target person and indicates a current position of the at least one search target person to function as:

an information providing unit configured to provide a terminal apparatus of a searcher with the position data of the at least one search target person in response to an information request from the terminal apparatus of the searcher; and a communication mediation unit configured to receive, from the terminal apparatus, a communication request for requesting communication with a search target person who is selected by the searcher based on the provided position data, and to transmit a communication message to a communication apparatus of the selected search target person.

(18) A terminal apparatus including:

a data acquisition unit configured to acquire position data from a server that includes a database regarding at least one search target person and collects the position data indicating a current position of each search target person; and a user interface unit configured to cause a screen to display the position data acquired by the data acquisition unit, and to allow a searcher to select a search target person based on the position data, wherein the user interface unit transmits, to the server, a communication request for requesting communication with the search target person who is selected by the searcher.

(19) A communication apparatus including:
a position transmission unit configured to measure a current position of a photographer, and to transmit position data to a server, the position data indicating the current position;
a notification unit configured to, when a communication message is received, notify the photographer that the communication message has been received, the communication message indicating that a user who desires to take a photograph has selected the photographer based on the position data provided by the server; and
an image transmission unit configured to acquire, from a camera of the photographer, an image shot for the user, and to transit the acquired image and identification information of the user to an apparatus that provides the user with the image.

What is claimed is:

1. An information processing apparatus, comprising:
    a storage device configured to store position data that indicates a first current position of a communication apparatus of a plurality of communication apparatuses, wherein the communication apparatus is associated with a first user; and
    at least one processor configured to:
        transmit the position data to a first terminal apparatus of a second user based on reception of an information request from the first terminal apparatus of the second user,
            wherein the position data transmitted based on a search condition to search target person data,
            wherein the target person data is related to the plurality of communication apparatuses,
            wherein the search condition includes a second current position of the first terminal apparatus, and
            wherein the first terminal apparatus displays a map that includes the position data;
        receive, from the first terminal apparatus, a communication request for communication with the communication apparatus which is selected based on a selection input on the position data displayed on the first terminal apparatus of the second user;
        generate a communication message based on the position data and the second current position of the first terminal apparatus,
            wherein the communication message indicates an appointed place on the displayed map; and
        transmit the communication message to the communication apparatus.

2. The information processing apparatus according to claim 1,
    wherein the information request indicates the second current position of the first terminal apparatus, and
    wherein the at least one processor is further configured to transmit, to the first terminal apparatus, the position data that is filtered based on the second current position of the first terminal apparatus.

3. The information processing apparatus according to claim 1,
    wherein the storage device is further configured to store the target person data,
    wherein the selection input on the position data is based on the target person data, and
    wherein the at least one processor is further configured to transmit, to the first terminal apparatus, the target person data that corresponds to the communication apparatus and the position data.

4. The information processing apparatus according to claim 1,
    wherein the storage device is further configured to store the target person data,
    wherein the selection input on the position data is based on the target person data,
    wherein the at least one processor is further configured to transmit, to the first terminal apparatus, the position data,
    wherein the position data is filtered based on the search condition and the target person data, and
    wherein the search condition is at least one of registered by the first terminal apparatus or indicated by the information request.

5. The information processing apparatus according to claim 3,
    wherein the first terminal apparatus is associated with the second user who desires to take a photograph,
    wherein the first user is a candidate from a plurality of users who takes the photograph for the second user, and
    wherein the plurality of users are associated with the plurality of communication apparatuses.

6. The information processing apparatus according to claim 5,
    wherein the target person data includes at least one of face image data, attribute data, model data, or achievement data of the plurality of users.

7. The information processing apparatus according to claim 1,
    wherein the at least one processor is further configured to transmit, to the first terminal apparatus, the position data and the map, and
    wherein the map includes an icon that corresponds to the first current position of the communication apparatus.

8. The information processing apparatus according to claim 7,
    wherein the storage device is further configured to store data that indicates a movement range of each communication apparatus of the plurality of communication apparatuses,
    wherein the at least one processor is further configured to superimpose an object on the map based on the stored data, and
    wherein the object represents the movement range that includes the first current position.

9. The information processing apparatus according to claim 5, wherein the at least one processor is further configured to:
    receive an image shot by the communication apparatus; and
    enable the first terminal apparatus to access the received image.

10. The information processing apparatus according to claim 9,
    wherein the at least one processor is further configured to restrict a second terminal apparatus to access the received image, wherein the second terminal apparatus is associated with a third user, and
    wherein the second terminal apparatus is different from the first terminal apparatus.

11. The information processing apparatus according to claim 9, wherein the at least one processor is further configured to enable the communication apparatus to access the image based on a permission received from the first terminal apparatus.

12. The information processing apparatus according to claim 9,
wherein the at least one processor is further configured to issue an instruction to the communication apparatus to delete original data of the image.

13. The information processing apparatus according to claim 9,
wherein the at least one processor is further configured to control the first terminal apparatus to display a window to enable purchase of the image received from the communication apparatus.

14. The information processing apparatus according to claim 13,
wherein the storage device is further configured to store the target person data for the plurality of users,
wherein the target person data includes achievement data associated with a service provided by the first user, and
wherein the at least one processor is further configured to update, based on a purchase of the image by the second user, the search target person data associated with the first user.

15. An information processing method, comprising:
in an information processing apparatus:
receiving position data from a communication apparatus of a plurality of communication apparatuses, the position data indicating a first current position of the communication apparatus,
wherein the communication apparatus is associated with a first user;
storing, by the information processing apparatus, the received position data in a storage device;
transmitting, to a first terminal apparatus of a second user, the position data based on reception of an information request from the first terminal apparatus of the second user,
wherein the position data is transmitted based on a search condition to search target person data,
wherein the target person data is related to the plurality of communication apparatuses,
wherein the search condition includes a second current position of the first terminal apparatus, and
wherein the first terminal apparatus displays a map that includes the position data;
receiving, from the first terminal apparatus, a communication request for requesting communication with the communication apparatus which is selected based on a selection input on the position data displayed on the first terminal apparatus of the second user;
generating a communication message based on the position data and the second current position of the first terminal apparatus,
wherein the communication message indicates an appointed place on the displayed map; and
transmitting the communication message to the communication apparatus.

16. A non-transitory computer-readable medium having stored thereon computer-executable instructions which, when executed by a computer, cause the computer to execute operations, the operations comprising:
receiving position data from a communication apparatus of a plurality of communication apparatuses, the position data indicating a first current position of the communication apparatus, wherein the communication apparatus is associated with a first user;
storing, by the computer, the received position data in a storage device;
transmitting, to a first terminal apparatus of a second user, the position data based on reception of an information request from the first terminal apparatus of the second user,
wherein the position data is transmitted based on a search condition to search target person data,
wherein the target person data is related to the plurality of communication apparatuses,
wherein the search condition includes a second current position of the first terminal apparatus, and
wherein the first terminal apparatus displays a map that includes the position data; and
receiving, from the first terminal apparatus, a communication request for requesting communication with the communication apparatus which is selected based on a selection input on the position data displayed on the first terminal apparatus of the second user;
generating a communication message based on the position data and the second current position of the first terminal apparatus,
wherein the communication message indicates an appointed place on the displayed map; and
transmitting the communication message to the communication apparatus.

17. A terminal apparatus, comprising:
a display screen; and
a central processing unit (CPU) configured to:
transmit an information request to a server, wherein the information request includes a first current position of the terminal apparatus;
acquire position data from the server, wherein the position data indicates a second current position of a communication apparatus of a plurality of communication apparatuses, and wherein the communication apparatus is associated with a first user,
wherein the server includes a database that stores the position data;
control the display screen to display a map that includes the acquired position data,
wherein the communication apparatus is selected based on a selection input on the displayed position data; and
transmit, to the server, a communication request for communication with the selected communication apparatus,
wherein, based on the communication request, the server is configured to:
generate a communication message based on the position data and the first current position of the terminal apparatus,
wherein the communication message indicates an appointed place on the displayed map; and
transmit the communication message to the communication apparatus.

18. A communication apparatus, comprising:
a central processing unit (CPU) configured to:
determine a current position of a service provider;
transmit, to a server, position data,
wherein the position data indicates the current position of the service provider;
receive a communication message from the server;
generate a notification based on the received communication message;

notify, based on the generated notification, the reception of communication message to the service provider, wherein the communication message indicates:
   a user selection of the service provider for a service, based on the position data provided by the server, and
   an appointed place for the service provider;

acquire, from a camera of the service provider, an image shot for a user who provides the user selection; and transmit the acquired image and identification information of the user to an apparatus that provides the user with the image.

19. The terminal apparatus according to claim 17, wherein the CPU is further configured to display the map that includes a ranking associated with each communication apparatus of the plurality of communication apparatuses.

* * * * *